US011210048B2

(12) United States Patent
Kusunoki et al.

(10) Patent No.: US 11,210,048 B2
(45) Date of Patent: Dec. 28, 2021

(54) DISPLAY DEVICE, DISPLAY MODULE, AND ELECTRONIC DEVICE

(71) Applicant: Semiconductor Energy Laboratory Co., Ltd., Atsugi (JP)

(72) Inventors: Koji Kusunoki, Isehara (JP); Daisuke Kubota, Atsugi (JP); Tetsuji Ishitani, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 17/016,773

(22) Filed: Sep. 10, 2020

(65) Prior Publication Data

US 2021/0103419 A1   Apr. 8, 2021

(30) Foreign Application Priority Data

Oct. 4, 2019 (JP) .............................. JP2019-183956

(51) Int. Cl.
*G09G 5/00* (2006.01)
*G06F 3/14* (2006.01)
(Continued)

(52) U.S. Cl.
CPC ............. *G06F 3/1423* (2013.01); *G09G 3/32* (2013.01); *G09G 3/3648* (2013.01); *G09G 2300/0426* (2013.01); *G09G 2380/10* (2013.01)

(58) Field of Classification Search
CPC .. G09G 3/34; G09G 3/32; G09G 3/20; G09G 3/3648; G09G 5/10; G09G 2300/046;
(Continued)

(56) References Cited

U.S. PATENT DOCUMENTS 6,750,932 B2   6/2004 Kim
8,048,728 B2 * 11/2011 Yamazaki ........... H01L 27/1214
438/164
(Continued)

FOREIGN PATENT DOCUMENTS

JP   2007-096055 A   4/2007
JP   2007-123861 A   5/2007
WO  WO-2017/208161  12/2017

*Primary Examiner* — Vijay Shankar
(74) *Attorney, Agent, or Firm* — Robinson Intellectual Property Law Office; Eric J. Robinson

(57) ABSTRACT

A display device suitable for application is provided. A display device capable of displaying images with high quality and with low power consumption is provided. The display device includes a first display portion, a second display portion, a non-display portion, a first substrate, and a second substrate. The first substrate and the second substrate are provided to face each other with the first display portion, the second display portion, and the non-display portion provided therebetween. The first display portion and the second display portion are provided apart from each other with the non-display portion therebetween. A plurality of liquid crystal elements are arranged in a matrix in the first display portion. A plurality of light-emitting elements are arranged in a matrix in the second display portion. The liquid crystal element reflects light to the second substrate side. The light-emitting element emits light to the second substrate side.

11 Claims, 11 Drawing Sheets

(51) Int. Cl.
  *G09G 3/36* (2006.01)
  *G09G 3/32* (2016.01)

(58) Field of Classification Search
  CPC ..... G09G 2300/0456; G09G 2300/023; G09G 2320/0626; G09G 2330/021; G09G 2340/0407; G09G 2360/144; G09G 2300/0426; G09G 2380/10; G09G 2380/04; G09G 2330/04; G09G 2360/04; G09G 2300/043; G09G 3/3208; G02F 2201/44; G02F 1/133555; G06F 3/1423
  See application file for complete search history.

(56) References Cited

U.S. PATENT DOCUMENTS

| | | | |
|---|---|---|---|
| 8,748,243 B2* | 6/2014 | Yamazaki | H01L 27/1214 438/162 |
| 8,907,879 B2* | 12/2014 | Yoshida | G09G 5/005 345/89 |
| 9,035,867 B2* | 5/2015 | Yoshida | H01L 27/12 345/102 |
| 9,298,035 B2 | 3/2016 | Yamazaki et al. | |
| 10,453,401 B2* | 10/2019 | Yamazaki | G09G 5/10 |
| 2004/0027315 A1 | 2/2004 | Senda et al. | |
| 2004/0252076 A1 | 12/2004 | Kodama | |
| 2007/0176847 A1 | 8/2007 | Shah et al. | |
| 2007/0242031 A1 | 10/2007 | Kimura et al. | |
| 2008/0254560 A1* | 10/2008 | Yamazaki | H01L 27/1214 438/33 |
| 2010/0026632 A1 | 2/2010 | Ishida et al. | |
| 2010/0118065 A1 | 5/2010 | Song et al. | |
| 2010/0207903 A1 | 8/2010 | Kim et al. | |
| 2010/0231501 A1 | 9/2010 | Mun et al. | |
| 2010/0333006 A1 | 12/2010 | Ostergard et al. | |
| 2011/0043435 A1 | 2/2011 | Hebenstreit et al. | |
| 2011/0063340 A1 | 3/2011 | Umezaki et al. | |
| 2011/0157254 A1 | 6/2011 | Yamazaki et al. | |
| 2011/0199404 A1 | 8/2011 | Umezaki et al. | |
| 2012/0026434 A1 | 2/2012 | Chen | |
| 2012/0208637 A1 | 8/2012 | Hirakata | |
| 2013/0278800 A1 | 10/2013 | Liu | |
| 2014/0226275 A1 | 8/2014 | Ko et al. | |
| 2014/0268276 A1 | 9/2014 | Hu et al. | |
| 2016/0012783 A1 | 1/2016 | Kimura et al. | |
| 2016/0041428 A1 | 2/2016 | Hirakata et al. | |
| 2016/0042696 A1 | 2/2016 | Hirakata et al. | |
| 2016/0042702 A1 | 2/2016 | Hirakata et al. | |
| 2016/0210910 A1 | 7/2016 | Yamazaki et al. | |
| 2016/0283028 A1 | 9/2016 | Yamazaki et al. | |
| 2016/0299387 A1 | 10/2016 | Yamazaki et al. | |
| 2016/0313769 A1 | 10/2016 | Yoshitani et al. | |
| 2016/0329032 A1 | 11/2016 | Tsujimoto | |
| 2017/0040402 A1 | 2/2017 | Yasumoto et al. | |
| 2017/0082882 A1 | 3/2017 | Hirakata et al. | |
| 2017/0082887 A1 | 3/2017 | Kubota et al. | |
| 2017/0090246 A1 | 3/2017 | Seo et al. | |
| 2017/0098689 A1 | 4/2017 | Ikeda et al. | |
| 2017/0102598 A1 | 4/2017 | Nakada et al. | |
| 2017/0103697 A1 | 4/2017 | Kawashima et al. | |
| 2017/0103714 A1 | 4/2017 | Yamamoto et al. | |
| 2017/0104049 A1 | 4/2017 | Nakamura et al. | |
| 2017/0116929 A1 | 4/2017 | Hirakata | |
| 2017/0123268 A1 | 5/2017 | Sasaki et al. | |
| 2017/0131594 A1 | 5/2017 | Nakada et al. | |
| 2017/0139253 A1 | 5/2017 | Hirakata et al. | |
| 2017/0153695 A1 | 6/2017 | Kawashima et al. | |
| 2017/0176791 A1 | 6/2017 | Kubota et al. | |
| 2017/0177116 A1 | 6/2017 | Jinbo et al. | |
| 2017/0205925 A1 | 7/2017 | Yamazaki et al. | |
| 2017/0365234 A1* | 12/2017 | Yamazaki | G09G 5/10 |
| 2018/0005567 A1 | 1/2018 | Takahashi et al. | |
| 2018/0011676 A1 | 1/2018 | Han et al. | |
| 2018/0068609 A1 | 3/2018 | Yamazaki et al. | |
| 2020/0074940 A1* | 3/2020 | Yamazaki | G09G 5/10 |

* cited by examiner

DISPLAY DEVICE, DISPLAY MODULE, AND ELECTRONIC DEVICE

BACKGROUND OF THE INVENTION

1. Field of the Invention

One embodiment of the present invention relates to a display device. One embodiment of the present invention relates to an electronic device including a display device.

Note that one embodiment of the present invention is not limited to the above technical field. Examples of the technical field of one embodiment of the present invention disclosed in this specification and the like include a semiconductor device, a display device, a light-emitting device, a power storage device, a memory device, an electronic device, a lighting device, an input device, an input/output device, a driving method thereof, and a manufacturing method thereof. A semiconductor device generally means a device that can function by utilizing semiconductor characteristics.

2. Description of the Related Art

An example of display devices is a liquid crystal display device provided with a liquid crystal element. For example, an active matrix liquid crystal display device, in which pixel electrodes are arranged in a matrix and transistors are used as switching elements connected to respective pixel electrodes, has attracted attention.

For example, an active matrix liquid crystal display device in which transistors whose channel formation regions are formed using a metal oxide are included as switching elements connected to respective pixel electrodes is known (Patent Documents 1 and 2).

As active matrix liquid crystal display devices, two major types are known: a transmissive type and a reflective type.

A transmissive liquid crystal display device displays an image by per-pixel control of the amount of light emitted from a backlight to the outside of the liquid crystal display device through a liquid crystal, utilizing optical modulation action of the liquid crystal. In contrast, a reflective liquid crystal display device displays an image by per-pixel control of the amount of external light, i.e., incident light that is reflected by the pixel electrode and output to the outside of the liquid crystal display device. A reflective liquid crystal display device does not use a backlight unlike a transmissive liquid crystal display device, and thus has an advantage of low power consumption.

REFERENCE

Patent Documents

[Patent Document 1] Japanese Published Patent Application No. 2007-123861

[Patent Document 2] Japanese Published Patent Application No. 2007-096055

SUMMARY OF THE INVENTION

A display device used in an electronic device such as a television device, a monitor device of a computer, a smart phone, and a tablet terminal is required to have high image quality and high resolution to display a variety of images. On the other hand, some display devices such as electronic devices using a segment type liquid crystal display device are required to have a capability of constant display with low-power consumption instead of high image quality and high resolution. Thus, the most suitable display device is selected in accordance with the use and the image to be displayed.

An object of one embodiment of the present invention is to provide a display device capable of performing display suitable for the use. Another object is to provide a display device capable of displaying an image with high display quality and displaying an image with low power consumption. Another object is to provide a display device capable of efficiently displaying a moving image with fast motions and a moving image with slow motions or a still image. Another object is to provide a highly reliable display device. Another object is to provide a display device, an electronic device, and the like with a novel structure.

Note that the descriptions of these objects does not preclude the existence of other objects. One embodiment of the present invention does not have to achieve all these objects. Note that other objects can be derived from the descriptions of the specification, the drawings, the claims, and the like.

One embodiment of the present invention is a display device including a first display portion, a second display portion, a non-display portion, a first substrate, a second substrate. The first display portion and the second display portion are provided apart from each other with the non-display portion therebetween. The first substrate and the second substrate are provided to face each other. The first substrate and the second substrate each spans the first display portion, the second display portion, and the non-display portion. A plurality of liquid crystal elements are arranged in a matrix in the first display portion. A plurality of light-emitting elements are arranged in a matrix in the second display portion. The liquid crystal element and the light-emitting element are provided between the first substrate and the second substrate. The liquid crystal element reflects visible light to the second substrate side. The light-emitting element emits visible light to the second substrate side.

In the above, the display device can include a first insulating layer and a second insulating layer. In this case, it is preferable that the first insulating layer be provided to cover the light-emitting element and include an inorganic compound. It is also preferable that the second insulating layer be provided to cover the first insulating layer and include an organic compound. The liquid crystal element is preferably provided over the second insulating layer.

In the above, the display device preferably includes a first transistor and a second transistor. The liquid crystal element preferably includes a first electrode, a liquid crystal layer, and a second electrode from the first substrate side. The light-emitting element preferably includes a third electrode, a light-emitting layer, and a fourth electrode from the first substrate side. It is preferable that the first electrode be electrically connected to the first transistor and the third electrode be electrically connected to the second transistor.

In the above, the display device preferably includes a conductive layer provided on the same plane as the third electrode. In this case, the first transistor and the first electrode are preferably electrically connected to each other through the conductive layer.

In the above, the display device preferably includes a light-blocking layer positioned in the non-display portion and positioned closer to the second substrate than the liquid crystal element and the light-emitting element are.

In the above, the display device preferably includes an adhesive layer positioned between the light-emitting element and the second substrate. In addition, the light-emitting element preferably has a function of emitting visible light to the second substrate side through the adhesive layer.

In the above, a first image on the first display portion is preferably displayed at a lower frame frequency than a second image on the second display portion.

Another embodiment of the present invention is a display module including any one of the above display devices. The display device is configured to be attachable to a dashboard of a car. A first image displayed on the first display portion preferably includes an image including information on at least one of a speed and a rotation speed. A second image displayed on the second display portion preferably includes an image including information on at least one of a remaining amount of fuel, a temperature of cooling water, a mileage, and a transmission state.

Another embodiment of the present invention is an electronic device including any one of the above display devices. A first image displayed on the first display portion includes a moving image including information on at least one of a product or a usage of the product. A second image displayed on the second display portion includes a still image including information on at least one of a name, a price, a production area, an ingredient, and contents of the product.

In the display module or the electronic device, the first image is preferably displayed at a lower frame frequency than the second image.

According to one embodiment of the present invention, a display device capable of performing display suitable for the use can be provided. Alternatively, a display device capable of displaying an image with high display quality and displaying an image with low power consumption can be provided. Alternatively, a display device capable of efficiently displaying a moving image with fast motions and a moving image with slow motions or a still image can be provided. Alternatively, a highly reliable display device can be provided. Alternatively, a display device, an electronic device, and the like with a novel structure can be provided.

Note that the descriptions of these effects do not preclude the existence of other effects. One embodiment of the present invention does not necessarily achieve all the effects listed above. Other effects can be derived from the description of the specification, the drawings, the claims, and the like.

DETAILED DESCRIPTION OF THE INVENTION

Figure 1A:
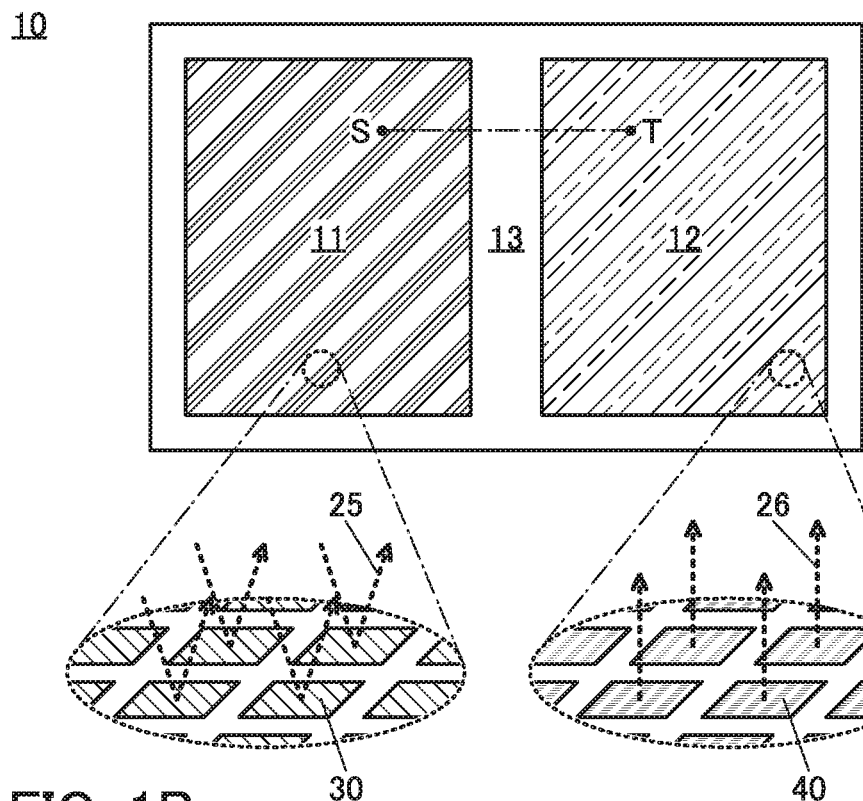
FIGS. 1A and 1B illustrate a structure example of a display device.

Hereinafter, embodiments will be described with reference to drawings. Note that embodiments can be implemented in many different modes, and it will be readily understood by those skilled in the art that modes and details thereof can be changed in various ways without departing from the spirit and scope of the present invention. Thus, the present invention should not be interpreted as being limited to the following description of the embodiments.

Note that in structures of the present invention described below, the same portions or portions having similar functions are denoted by the same reference numerals in different drawings, and the description thereof is not repeated. The same hatching pattern is used for portions having similar functions, and the portions are not denoted by specific reference numerals in some cases.

Note that in each drawing described in this specification, the size, the layer thickness, or the region of each component is exaggerated for clarity in some cases. Therefore, the size, the layer thickness, or the region is not limited to the illustrated scale.

Note that in this specification and the like, ordinal numbers such as "first" and "second" are used in order to avoid confusion among components and do not limit the number.

In this specification and the like, a display panel that is one embodiment of the display device has a function of displaying (outputting) an image or the like on (to) a display surface. Thus, the display panel is one embodiment of an output device.

In this specification and the like, a structure in which a connector such as a flexible printed circuit (FPC) or a tape carrier package (TCP) is attached to a substrate of a display panel, or a structure in which an integrated circuit (IC) is mounted on a substrate by a chip on glass (COG) method or the like is referred to as a display panel module or a display module, or simply referred to as a display panel or the like in some cases.

Note that in this specification and the like, a touch panel that is one embodiment of the display device has a function of displaying an image or the like on a display surface and a function as a touch sensor capable of sensing contact, press, approach, or the like of an object such as a finger or a stylus with, on, or to the display surface. Therefore, the touch panel is one embodiment of an input/output device.

A touch panel can be referred to as, for example, a display panel (or a display device) with a touch sensor or a display panel (or a display device) having a touch sensor function. A touch panel can include a display panel and a touch sensor panel. Alternatively, a touch panel can have a function of a touch sensor inside a display panel or on a surface of the display panel.

In this specification and the like, a structure in which a connector or an IC is attached to a substrate of a touch panel is referred to as a touch panel module or a display module, or simply referred to as a touch panel or the like in some cases.

Embodiment 1

In this embodiment, a display device of one embodiment of the present invention and a fabrication method thereof will be described.

A display device of one embodiment of the present invention includes a first display portion, a second display portion, and a non-display portion. The non-display portion is positioned between the first display portion and the second display portion, and the first display portion and the second display portion are provided apart from each other with the non-display portion therebetween. In other words, in a plan view, the non-display portion is provided between the first display portion and the second display portion.

The first display portion includes first display elements arranged in a matrix. The second display portion includes second display elements arranged in a matrix. Different display elements may be used as the first display element and the second display element.

As the first display element, an element that expresses gray scales by controlling the amount of reflected light or transmitted light can be used. It is particularly preferable to use an element that performs display utilizing reflected light. Such an element includes no light source, resulting in extremely low power consumption in display.

As the first display element, typically, a reflective liquid crystal element can be used. As the first display element, an element using a microcapsule method, an electrophoretic method, an electrowetting method, an Electronic Liquid Powder (registered trademark) method, or the like can also be used, other than a transmissive liquid crystal element, a semi-transmissive liquid crystal element, a microelectromechanical systems (MEMS) shutter element, or an optical interference type MEMS element.

A front light may be used as a light source for irradiating the first display element with light. This enables the first display portion to display a clear image even in a dark environment with low external light illuminance.

It is also possible to use, as the first display element, a semi-transmissive liquid crystal element capable of performing display using reflected light and display using transmitted light. For example, as the first display element, it is possible to use a semi-transmissive liquid crystal element having a function of controlling the amount of transmitted light from the backlight that is a light source and a function of controlling the amount of reflected external light. The backlight is preferably an edge-light backlight with an LED light source that facilitates a reduction in the thickness of the display device.

As the second display element provided in the second display portion, a light-emitting element can be suitably used. Specifically, it is preferable to use an electroluminescent element in which light emission can be extracted from a light-emitting substance by application of an electric field. Since the luminance and the chromaticity of light emitted from such a pixel are not affected by external light, display with high color reproducibility (a wide color gamut) and high contrast can be performed. Thus, the second display portion can display a more vivid image than the first display portion.

As the second display element, for example, a self-luminous light-emitting element such as an organic light-emitting diode (OLED), a light-emitting diode (LED), a quantum-dot light-emitting diode (QLED), or a semiconductor laser can be used.

For example, the first display portion can display an image using light reflected by the first display element. The first display portion can perform display without a light source, and thus can be driven with extremely low power. In particular, the power consumption can be extremely low when the illuminance of external light is sufficiently high. Furthermore, the first display portion can perform eye-friendly display using reflected external light, thereby mitigating eyestrain.

It is preferable that the first display portion can perform display at a lower frame frequency than the second display portion. The first display portion may always display an image at a lower frame frequency than the second display portion; alternatively, the first display portion may change the frame frequency in accordance with the image to be displayed (e.g., a still image or a moving image). This enables the power consumption of the first display portion to be reduced. The first display portion can suitably display a still image or a moving image with relatively small change.

The second display portion can display an image using light emitted from the second display element. Thus, an extremely vivid image can be displayed (display with high contrast and high color reproducibility can be performed) regardless of the illuminance and the chromaticity of external light. When a bright image is displayed under weak external light during the night, for example, a user might feel that the image is too bright. To prevent this, an image with reduced luminance is preferably displayed in the second display portion. Thus, excessive brightness can be suppressed and the power consumption can be reduced.

Furthermore, a light-emitting element responds much faster than a liquid crystal element and the like, and thus can display a smooth moving image. Moreover, it is preferable that the second display portion can perform display at a higher frame frequency than the first display portion. This enables a smoother moving image to be displayed. The second display portion can suitably display a moving image with relatively large change.

In one embodiment of the present invention, the first display element and the second display element are provided between a first substrate and a second substrate that are included in the display device. In this case, it is preferable that the second display element, a protective layer covering the second display element, and the first display element over the protective layer be provided on the first substrate side. It is also preferable that the protective layer include a first insulating layer containing an inorganic compound and a second insulating layer containing an organic compound from the second display element side. The first insulating layer can function as a protective film that prevents impurity diffusion into the second display element, and the second insulating layer positioned on the formation surface side of an electrode of the first display element can function as a planarization layer. Accordingly, a multifunctional display device with high reliability and high visibility that can be fabricated at low cost can be provided.

The display device preferably includes a first transistor electrically connected to the first display element and a second transistor electrically connected to the second display element. In this case, the first transistor and the second transistor are formed on the first substrate side. The first transistor and the second transistor are preferably formed through the same process. In this case, the first display element and the first transistor can be electrically connected to each other through an opening provided in the protective layer (the first insulating layer and the second insulating layer).

The display device of one embodiment of the present invention can display an image suitable for each of the first display portion and the second display portion, which are apart from each other with the non-display portion therebetween. For example, a still image such as text data, a moving image with small change, or the like can be displayed on the first display portion with low power consumption, and video contents, a moving image with fast motions, or the like can be smoothly displayed on the second display portion. Thus, the display device of one embodiment of the present invention can be suitably used for an apparatus with the limited uses. Note that a plurality of first display portions and a plurality of second display portions may be provided independently in the display device.

In the non-display portion provided between the first display portion and the second display portion, a wiring, a driver circuit for driving the first display portion or the second display portion, and the like can be provided. Thus, the non-display portion can be effectively utilized without being wasted. When a driver circuit and a wiring are provided in the non-display portion, a light-blocking layer is preferably provided closer to the display surface than the driver circuit and the wiring so that the driver circuit and the wiring are not recognized. Thus, a highly designed display device can be provided.

Specific structure examples, fabrication method examples, and the like of the display device of one embodiment of the present invention are described below with reference to drawings.

Structure Example 1 of Display Device

FIG. 1A is a schematic top view of a display device 10. The display device 10 includes a display portion 11, a display portion 12, and a non-display portion 13.

The display portion 11 includes a plurality of liquid crystal elements 30. The display portion 12 includes a plurality of light-emitting elements 40. The plurality of liquid crystal elements 30 and the plurality of light-emitting elements 40 function as display elements and are arranged in a matrix.

Although the display portions 11 and 12 have almost the same external shape here, they may have different external shapes. In addition, the display portions 11 and 12 may differ in the layout, arrangement pitch, definition, and the like of the display elements. When having the same definition, the display portions 11 and 12 can display images with the same definition. In the case where the display portions 11 and 12 have different definitions, the display portion 12 preferably has higher definition than the display portion 11. Thus, the display portion 12 can display a smooth and high-definition moving image.

The lower left portion of FIG. 1A is an enlarged view of part of the display portion 11. As the display element included in the display portion 11, the liquid crystal element 30 that performs display by reflecting external light is used. FIG. 1A schematically shows reflected light 25, which is external light incident on and reflected by the liquid crystal element 30. The amount of the reflected light 25 reflected by the liquid crystal element 30 is controlled in each liquid crystal element 30, whereby the display portion 11 can display an image.

The lower right portion of FIG. 1A is an enlarged view of part of the display portion 12. As the display element included in the display portion 12, the light-emitting element 40 is used. FIG. 1A schematically shows light 26 emitted from the light-emitting element 40. The amount of the light 26 emitted from the light-emitting element 40 is controlled in each light-emitting element 40, whereby the display portion 12 can display an image.

That is, the display portion 11 is a region having a function of displaying an image utilizing reflected light. The display portion 12 is a region having a function of displaying an image utilizing emitted light. For example, the display portion 11 can suitably display text data, a still image, or a moving image with gradual (small) change, and the like. In contrast, the display portion 12 can suitably display a vivid still image, a vivid moving image, a moving image with large change (i.e., with fast motions), a high-contrast still image, a high-contrast moving image, and the like.

The non-display portion 13 is provided between the display portions 11 and 12 and along the peripheral portion of the display device 10. The non-display portion 13 is provided with no display element and thus does not contribute to display. The non-display portion 13 can be provided with, for example, a wiring or an external connection terminal for connection to an FPC, an IC, or the like.

The non-display portion 13 preferably includes circuits such as a gate driver circuit and a source driver circuit for driving the display portion 11 or the display portion 12. The number of the gate driver circuits and the number of the source driver circuits can each be equal to the number of the display portions 11 and 12. For example, in the case where one display portion 11 and one display portion 12 are provided, two gate driver circuits and two source driver circuits are provided in the non-display portion 13. Alternatively, the display portion 11 or 12 may include a pair of gate driver circuits. Alternatively, the gate driver circuit may be provided to overlap with the display portion 11 or 12. Alternatively, an IC functioning as the source driver circuit may be mounted on the external connection terminal provided in the non-display portion 13, or an FPC on which the IC is mounted may be connected to the external connection terminal provided in the non-display portion 13.

The display device of one embodiment of the present invention can select a display method most suitable for the image or information such as a text to be displayed, and thus can have a variety of modes in accordance with the use. In addition, the display device of one embodiment of the present invention can be designed with free selection of the number, size, shape, definition (pixel density), resolution (number of pixels), and the like of the display portions 11 and 12 in accordance with the kind and position of information to be displayed. Either monochrome display (including a single-color display) or color display can be selected for the image to be displayed on the display portions 11 and 12. Alternatively, color display can be performed using display elements of two colors. In this manner, the manufacturer (supplier) of the display device of one embodiment of the present invention can manufacture and sell the display device after customizing it to meet the needs of users (customers).

Cross-Sectional Structure Example 1

Figure 1B:
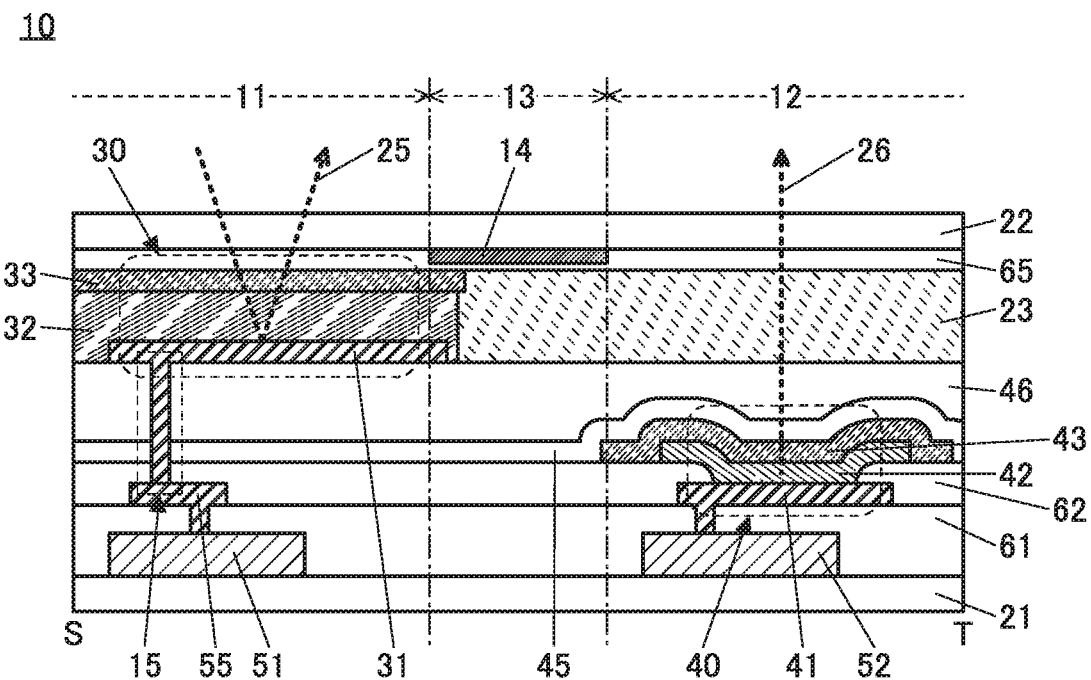

FIG. 1B is a schematic cross-sectional view of the display device 10. FIG. 1B is a schematic cross-sectional view taken along dashed-dotted line S-T including the display portion 11, the non-display portion 13, and the display portion 12 illustrated in FIG. 1A.

The display device 10 includes a transistor 51, a transistor 52, the liquid crystal element 30, the light-emitting element 40, and the like between a substrate 21 and a substrate 22. The substrates 21 and 22 are bonded to each other with an adhesive layer 23.

The transistors 51 and 52 are provided over the substrate 21. An insulating layer 61 is provided to cover the transistors 51 and 52.

The transistor 52 and the light-emitting element 40 are provided in the display portion 12.

The light-emitting element 40 has a stacked-layer structure in which a conductive layer 41, an EL layer 42, and a conductive layer 43 are stacked in this order from the substrate 21 side. The conductive layer 41 is provided over the insulating layer 61 and electrically connected to the transistor 52 through an opening provided in the insulating layer 61. An insulating layer 62 is provided to cover an end portion of the conductive layer 41, and the EL layer 42 and the conductive layer 43 are stacked over the insulating layer 62 and the conductive layer 41. The EL layer 42 preferably has an island-shaped top surface whose end portion is over the insulating layer 62. In addition, the conductive layer 43 is preferably provided to cover the end portion of the island-shaped EL layer 42.

The conductive layer 41 has a function of reflecting visible light. The conductive layer 43 has a function of transmitting visible light. Therefore, the light-emitting element 40 is a top-emission light-emitting element that emits light to the side opposite to the formation surface side.

An insulating layer 45 and an insulating layer 46 are stacked to cover the light-emitting element 40 and the insulating layer 62. The insulating layer 45 functions as a protective layer that prevents diffusion of impurities such as water into the light-emitting element 40. The insulating layer 45 preferably contains an inorganic compound such as silicon oxide, silicon oxynitride, silicon nitride, aluminum oxide, or hafnium oxide. The insulating layer 46 includes a formation surface of a conductive layer 31 and functions as a planarization film. The insulating layer 46 preferably contains an organic compound such as acrylic, epoxy, siloxane, or polyimide.

The transistor 51 and the liquid crystal element 30 are provided in the display portion 11.

The liquid crystal element 30 includes the conductive layer 31, a liquid crystal layer 32, and a conductive layer 33. The conductive layer 31 is provided over the insulating layer 46. The substrate 22 is provided with the conductive layer 33 that is on the substrate 21 side. The liquid crystal layer 32 is sandwiched between the conductive layers 31 and 33. The conductive layer 31 has a function of reflecting visible light, and the conductive layer 33 has a function of transmitting visible light. Thus, the liquid crystal element 30 is a reflective liquid crystal element.

Here, a conductive layer 55 electrically connected to the transistor 51 is provided over the insulating layer 61. The conductive layer 55 is electrically connected to the transistor 51 through an opening provided in the insulating layer 61. The conductive layer 55 and the conductive layer 41 are preferably formed by processing the same conductive film.

The conductive layer 31 is electrically connected to the conductive layer 55 through an opening provided in the insulating layers 46, 45, and 62, so that a connection portion 15 is formed. Thus, the conductive layer 31 and the transistor 51 are electrically connected to each other. Although the conductive layer 31 and the transistor 51 may be directly connected to each other without the conductive layer 55, the conductive layer 55 is preferably provided because the opening can be easily formed in the connection portion 15.

A light-blocking layer 14 is provided in the non-display portion 13. For the light-blocking layer 14, a material having a function of blocking visible light, such as a black matrix, can be used. When the light-blocking layer 14 is provided in the non-display portion 13, the wiring and the driver circuit provided in the non-display portion 13, or the internal structure of the apparatus on which the display device 10 is mounted can be inhibited from being seen, leading to higher design property of the display device 10 and the apparatus on which the display device 10 is mounted.

Although the light-blocking layer 14 is provided on the substrate 22 side here, the light-blocking layer 14 may be provided on the substrate 21 side. Alternatively, the light-blocking layer 14 is not necessarily provided if not needed.

In FIG. 1B, the light-blocking layer 14 is provided on the substrate 22 on the substrate 21 side, an insulating layer 65 is provided to cover the light-blocking layer 14, and the conductive layer 33 is provided to cover part of the insulating layer 65. The insulating layer 65 is not necessarily provided if not needed.

Here, the conductive layer 43 of the light-emitting element 40 is formed not to be positioned at least in the connection portion 15 of the display portion 11. FIG. 1B illustrates an example in which the conductive layer 43 is formed not to be positioned in the display portion 11. This can prevent the conductive layers 31 and 43 from being in contact with each other in the connection portion 15 and being electrically short-circuited. The conductive layer 43 can be formed by a vacuum evaporation method or a sputtering method using a metal mask or a shielding mask, for example.

As illustrated in FIG. 1B, the adhesive layer 23 preferably includes a portion positioned in the display portion 12. Accordingly, the light 26 emitted from the light-emitting element 40 can be emitted to the outside through the adhesive layer 23. For example, the adhesive layer 23 is provided to fill the space between the substrates 21 and 22, whereby the extraction efficiency of the light 26 emitted from the light-emitting element 40 can be increased. Furthermore, the adhesion area between the substrates 21 and 22 can be increased, so that the strength of the display device 10 can be increased.

Since the adhesive layer 23 is in contact with the liquid crystal layer 32, a material whose component is less likely to diffuse into the liquid crystal layer 32 is preferably used for the adhesive layer 23. A sealing layer including a material whose component is less likely to diffuse into the liquid crystal layer 32 may be provided between the adhesive layer 23 and the liquid crystal layer 32. The sealing layer can be provided to surround the display portion 11.

Cross-Sectional Structure Example 2

Hereinafter, a more specific example of cross-sectional structure of the display device of one embodiment of the present invention will be described.

Structure Example 2-1

Figure 2:
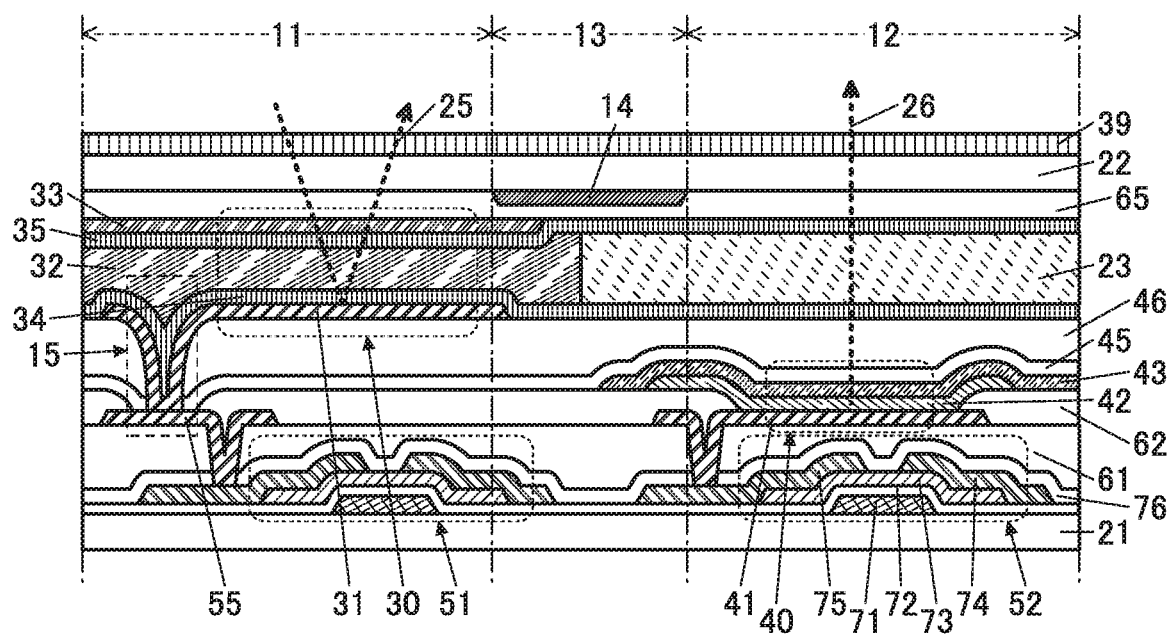
FIG. 2 illustrates a structure example of a display device.

FIG. 2 is a schematic cross-sectional view of a display device 10A.

The transistors 51 and 52 each include a conductive layer 71, an insulating layer 72, a semiconductor layer 73, a conductive layer 74, and a conductive layer 75. Part of the conductive layer 71 functions as a first gate electrode. Part of the insulating layer 72 functions as a gate insulating layer. The semiconductor layer 73 partly includes a channel formation region. One of the conductive layers 74 and 75 functions as a source electrode and the other functions as a drain electrode.

The conductive layer 71 is provided over the substrate 21. The insulating layer 72 is provided to cover the conductive layer 71 and the substrate 21. The semiconductor layer 73 is provided over the insulating layer 72 and includes a region overlapping with the conductive layer 71. The conductive layers 74 and 75 are each in contact with the semiconductor layer 73 and each have an end portion over the semiconductor layer 73. The transistors 51 and 52 are each what is called bottom-gate transistors, in which a gate electrode is positioned closer to the formation surface than the semiconductor layer where a channel is formed is.

Note that the structure of the transistors 51 and 52 is not limited to the above, and a transistor with any of a variety of structures can be used. For example, a planar transistor, a staggered transistor, or an inverted staggered transistor can be used. A top-gate transistor or a bottom-gate transistor can be used. Alternatively, gates may be provided above and below a semiconductor layer where a channel is formed.

It is preferable that a semiconductor layer of a transistor contain a metal oxide (also referred to as an oxide semiconductor). Alternatively, a semiconductor layer of a transistor may contain silicon. Examples of silicon include amorphous silicon and crystalline silicon (e.g., low-temperature polysilicon or single crystal silicon).

There is no particular limitation on the crystallinity of a semiconductor material used for the transistor, and any of an amorphous semiconductor, a single crystal semiconductor, and a semiconductor having other crystallinity than single crystal (a microcrystalline semiconductor, a polycrystalline semiconductor, or a semiconductor partly including crystal regions) may be used. It is preferable that a single crystal semiconductor or a semiconductor having crystallinity be used, in which case degradation of transistor characteristics can be inhibited.

The semiconductor layer preferably contains indium, the element M (M is one or more kinds selected from gallium, aluminum, silicon, boron, yttrium, tin, copper, vanadium, beryllium, titanium, iron, nickel, germanium, zirconium, molybdenum, lanthanum, cerium, neodymium, hafnium, tantalum, tungsten, and magnesium), and zinc, for example. Specifically, the element M is preferably one or more kinds selected from aluminum, gallium, yttrium, and tin.

It is particularly preferable that an oxide containing indium, gallium, and zinc (also referred to as IGZO) be used as the semiconductor layer.

Alternatively, an oxide containing indium, gallium, zinc, and tin (also referred to as IGZTO); an oxide containing indium, tin, and zinc; an oxide containing indium and zinc; an oxide containing indium and tin; an oxide containing indium, tin, and silicon; or the like may be used. A transistor including a semiconductor layer containing such materials can have high field-effect mobility.

In the case where the semiconductor layer is an In-M-Zn oxide, the atomic ratio of In to M of a sputtering target used for forming the In-M-Zn oxide is preferably 1 or more. Examples of the atomic ratio of the metal elements in such a sputtering target include In:M:Zn=1:1:1, In:M:Zn=1:1:1.2, In:M:Zn=2:1:3, In:M:Zn=3:1:2, In:M:Zn=4:2:3, In:M:Zn=4:2:4.1, In:M:Zn=5:1:3, In:M:Zn=5:1:6, In:M:Zn=5:1:7, In:M:Zn=5:1:8, In:M:Zn=10:1:3, In:M:Zn=10:1:6, In:M:Zn=6:1:6, and In:M:Zn=5:2:5.

The sputtering target preferably contains a polycrystalline oxide, in which case the semiconductor layer having crystallinity is easily formed. Note that the atomic ratio of the formed semiconductor layer varies in the range of ±40% from any of the above atomic ratios of the metal elements of the sputtering target. For example, when a sputtering target with an atomic ratio of In:Ga:Zn=4:2:4.1 is used to form the semiconductor layer, the atomic ratio of the formed semiconductor layer may sometimes be 4:2:3 or in the vicinity thereof.

Note that the atomic ratio of In:Ga:Zn=4:2:3 or in the vicinity thereof includes the case where, when In is 4, Ga is greater than or equal to 1 and less than or equal to 3 and Zn is greater than or equal to 2 and less than or equal to 4. The atomic ratio of In:Ga:Zn=5:1:6 or in the vicinity thereof includes the case where, when In is 5, Ga is greater than 0.1 and less than or equal to 2 and Zn is greater than or equal to 5 and less than or equal to 7. The atomic ratio of In:Ga:Zn=1:1:1 or in the vicinity thereof includes the case where, when In is 1, Ga is greater than 0.1 and less than or equal to 2 and Zn is greater than 0.1 and less than or equal to 2.

An insulating layer 76 is provided to cover the transistors 51 and 52. The insulating layer 76 functions as a protective film that prevents diffusion of impurities such as water into the transistors 51 and 52. The insulating layer 76 preferably contains an inorganic compound like the insulating layer 45.

The insulating layer 61 is provided to cover the insulating layer 76. The insulating layer 61 includes a formation surface of the conductive layer 41 and functions as a planarization layer. The insulating layer 61 preferably contains an organic compound like the insulating layer 46.

The conductive layers 41 and 55 are provided over the insulating layer 61. The conductive layer 41 is electrically connected to the conductive layer 75 of the transistor 52 through an opening provided in the insulating layers 61 and 76. In a similar manner, the conductive layer 55 is electrically connected to the conductive layer 75 of the transistor 51.

The insulating layer 62 is provided to cover end portions of the conductive layers 41 and 55. In other words, the insulating layer 62 includes openings overlapping with the conductive layers 41 and 55.

In the light-emitting element 40, the EL layer 42 is formed to have an island shape. The conductive layer 43 is provided to cover an end portion of the EL layer 42. Thus, the EL layer 42 covered with the conductive layer 43 is not exposed, which can suitably inhibit diffusion of impurities such as water into the EL layer 42. The conductive layer 43 is provided to cover a plurality of EL layers 42 provided in the display portion 12, and functions as a common electrode. In the example shown in FIG. 2, one of the end portions of the conductive layer 43 is positioned in the non-display portion 13 and is not provided in the display portion 11.

The conductive layer 31 is provided over the insulating layer 46. In the connection portion 15, an opening is provided in the insulating layers 46 and 45 to overlap with the conductive layer 55, and the conductive layers 31 and 55 are electrically connected to each other through the opening. In FIG. 2, the insulating layers 45 and 46 are formed so that their side surfaces are continuous in the connection portion 15; however, one embodiment of the present invention is not limited thereto. The side surface of the insulating layer 45 may be positioned inward from the side surface of the insulating layer 46, or the side surface of the insulating layer 46 may be positioned inward from the side surface of the insulating layer 45. Alternatively, the insulating layer 46 may cover the side surface of the insulating layer 45.

In the liquid crystal element 30, an alignment film 34 is provided between the liquid crystal layer 32 and the conductive layer 31. In addition, an alignment film 35 is provided between the liquid crystal layer 32 and the conductive layer 33. FIG. 2 illustrates an example in which the alignment films 34 and 35 are provided also in the non-display portion 13 and the display portion 12. Note that the alignment films 34 and 35 are not necessarily provided if not needed.

A polarizing plate 39 is provided over the substrate 22 on the opposite side to the substrate 21. When light polarized by the polarizing plate 39 is incident on the liquid crystal element 30, the light is transmitted through the conductive layer 33 and the liquid crystal layer 32, reflected by the conductive layer 31, and transmitted through the liquid crystal layer 32 and the conductive layer 33 again to reach the polarizing plate 39. At this time, a voltage is applied between the conductive layers 31 and 33 to control the liquid crystal alignment in the liquid crystal layer 32, whereby the amount of the reflected light 25 transmitted through the polarizing plate 39 can be controlled.

Although the polarizing plate 39 is provided not only in the display portion 11 but also in the display portion 12 and the non-display portion 13 in FIG. 2, the polarizing plate 39 may be provided only in the display portion 11. In the case where a reflective liquid crystal element is used as the liquid crystal element 30, a circularly polarizing plate can be used as the polarizing plate 39. An example of a circularly polarizing plate is a stack of a linear polarizing plate and a quarter wave plate. The reflection of external light can be inhibited with a circularly polarizing plate. A light diffusion plate may be provided to reduce reflection of external light.

Structure Example 2-2

Figure 3A:
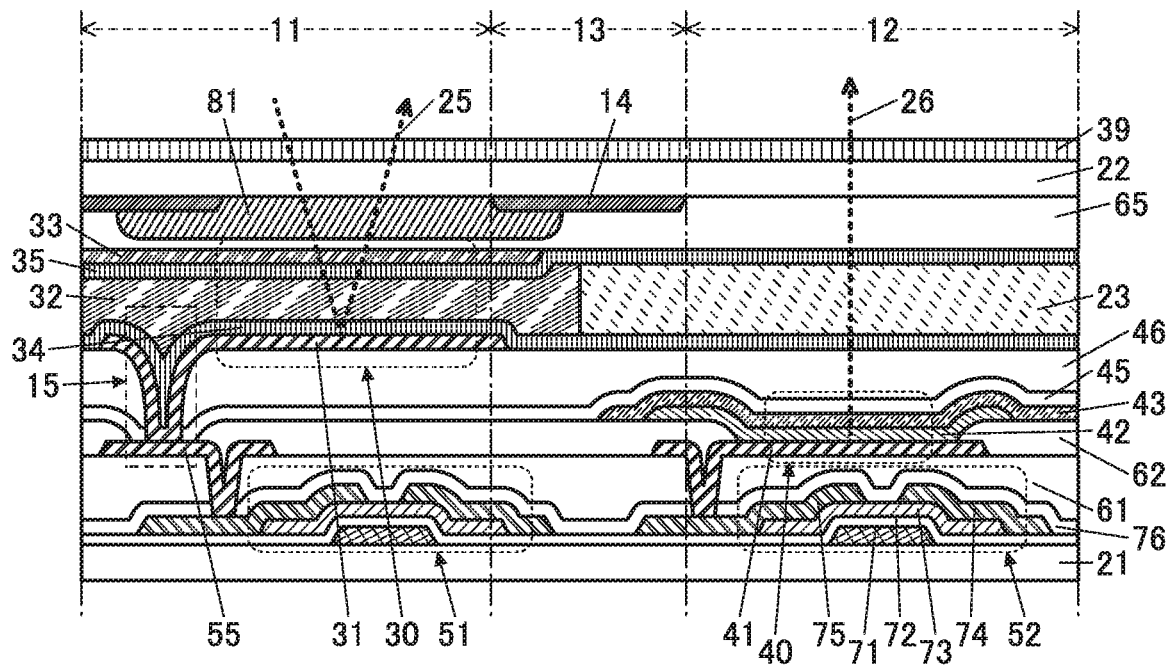
FIGS. 3A and 3B each illustrate a structure example of a display device.

FIG. 3A is a schematic cross-sectional view of a display device 10B whose structure is partly different from that of the display device 10A. The display device 10B is different from the display device 10A mainly in including a coloring layer 81.

The coloring layer 81 is provided to overlap with the liquid crystal element 30. The coloring layer 81 has a function of transmitting visible light in a specific wavelength range or a function of absorbing visible light in a specific wavelength range. For the coloring layer 81, a resin containing a dye or a pigment can be used, for example. When pixels each of which is provided with the coloring layer 81 transmitting any of red (R), green (G), and blue (B) are arranged in a matrix in the display portion 11, the display device 10B can perform full-color display in the display portion 11.

The substrate 22 is provided with the coloring layer 81 that is on the substrate 21 side. In the structure illustrated in FIG. 3A, the light-blocking layer 14 is provided over the substrate 22 on the substrate 21 side, the coloring layer 81 is provided to cover an opening in the light-blocking layer 14, and the insulating layer 65 is provided to cover the coloring layer 81 and the light-blocking layer 14. Note that the positions of the coloring layer 81 and the light-blocking layer 14 are not limited thereto, and the coloring layer 81 may be formed first.

Structure Example 2-3

Figure 3B:
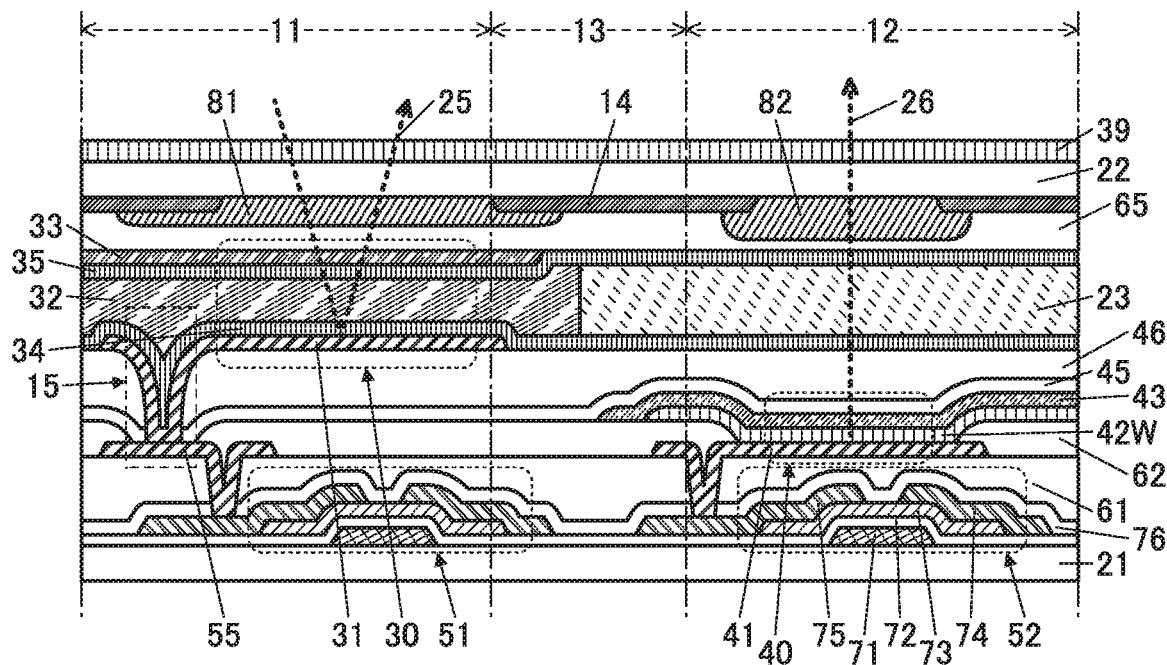

FIG. 3B is a schematic cross-sectional view of a display device 10C. The display device 10C is different from the display device 10B mainly in the structure of the light-emitting element 40 and in including a coloring layer 82.

The coloring layer 82 is provided to overlap with the light-emitting element 40. White light emitted from the light-emitting element 40 is partly absorbed by the coloring layer 82 and emitted to the outside. Thus, the display device 10C can perform color display.

The light-emitting element 40 includes an EL layer 42W and emits white light. The EL layer 42W can be provided in common for the plurality of light-emitting elements. Thus, there is no need to form the EL layers 42W separately for pixels of different colors, which is suitable for a high-definition display device (display portion).

Here, the light 26 from the light-emitting element 40 is transmitted through the coloring layer 82 only once, whereas the reflected light 25 reflected by the liquid crystal element 30 is transmitted through the coloring layer 81 twice in entering and in emitting. Thus, when the coloring layers 81 and 82 are formed to have the same thickness using the same material, the luminance of the reflected light 25 might be decreased. For this reason, the coloring layer 81 is preferably thinner than the coloring layer 82. Alternatively, the coloring layer 81 may have higher transmittance than the coloring layer 82 by having reduced concentration of a dye or a pigment.

Structure Example 2-4

Figure 4:
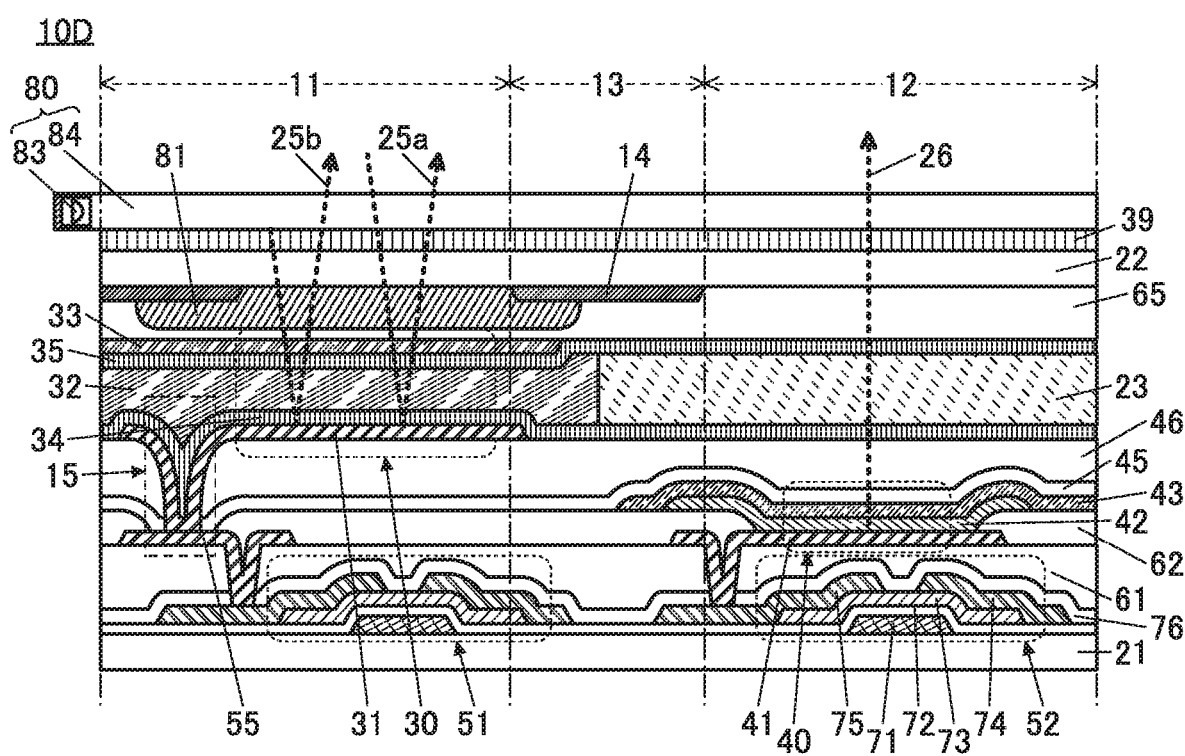
FIG. 4 illustrates a structure example of a display device.

FIG. 4 is a schematic cross-sectional view of a display device 10D. The display device 10D is different from the display device 10B mainly in including a front light 80.

The front light 80 includes a light source 83 and a light guide plate 84. The light source 83 has a function of emitting light from its side surface to the light guide plate 84. As the light source 83, a light-emitting diode (LED) can be typically used.

The display device 10D can display an image on the display portion 11 using one or both of reflected light 25a that is external light reflected by the liquid crystal element 30 and reflected light 25b that is light emitted from the front light 80 and reflected by the liquid crystal element 30.

In the structure illustrated in FIG. 4, the coloring layer 81 is provided to overlap with the liquid crystal element 30; thus, a white light source can be used as the light source 83 of the front light 80. Note that in the case where the display portion 11 does not perform color display, a single-color light source can be used as the light source 83. As a method for driving the liquid crystal element 30, a time-division display method (also referred to as a field sequential driving method) in which color display is performed on the basis of a successive additive color mixing method may be employed. In that case, three light sources of red, green, and blue can be used as the light source 83 of the front light 80 without the coloring layer 81.

Fabricating Method Example

An example of a method for fabricating the display device of one embodiment of the present invention is described below with reference to drawings. Here, the display device 10B described in Structure Example 2-2 with reference to FIG. 3A is used as an example.

Note that thin films included in the display device (e.g., insulating films, semiconductor films, or conductive films) can be formed by any of a sputtering method, a chemical vapor deposition (CVD) method, a vacuum evaporation method, a pulsed laser deposition (PLD) method, an atomic layer deposition (ALD) method, and the like. Examples of the CVD method include a plasma-enhanced chemical vapor deposition (PECVD) method and a thermal CVD method. Examples of the thermal CVD method include a metal organic chemical vapor deposition (MOCVD) method.

The thin films constituting the display device (i.e., the insulating film, the semiconductor film, the conductive film, and the like) can be formed by a method such as spin coating, dipping, spray coating, inkjet printing, dispensing, screen printing, or offset printing, or with a doctor knife, a slit coater, a roll coater, a curtain coater, or a knife coater.

When the thin films included in the display device are processed, a lithography method or the like can be used. Alternatively, island-shaped thin films may be formed by a film formation method using a blocking mask. Alternatively, a nanoimprinting method, a sandblasting method, a lift-off method, or the like may be used for the processing of the thin films. Examples of the photolithography method include the following two methods: a method in which a photosensitive resist material is applied to a thin film to be processed, the material is exposed to light through a photomask and then developed to form a resist mask, the thin film is processed by etching or the like, and the resist mask is removed; and a method in which a photosensitive thin film is formed and then exposed to light and developed to be processed into a desired shape.

As light for exposure in a lithography method when using light, light with an i-line (with a wavelength of 365 nm), light with a g-line (with a wavelength of 436 nm), light with an h-line (with a wavelength of 405 nm), or light in which the i-line, the g-line, and the h-line are mixed can be used. Alternatively, ultraviolet light, KrF laser light, ArF laser light, or the like can be used. Exposure may be performed by liquid immersion exposure technique. As the light for exposure, extreme ultraviolet (EUV) light or X-rays may also be used. Furthermore, instead of the light used for the exposure, an electron beam can also be used. It is preferable to use EUV, X-rays, or an electron beam because extremely minute processing can be performed. Note that a photomask is not needed when exposure is performed by scanning with a beam such as an electron beam.

For etching of the thin film, a dry etching method, a wet etching method, a sandblasting method, or the like can be used.

Figure 5A:
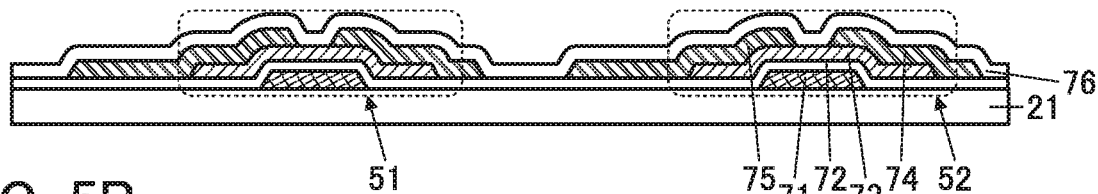
FIGS. 5A to 5E illustrate an example of a method for fabricating a display device.

First, the transistors 51 and 52 are formed over the substrate 21 (FIG. 5A).

A conductive film is formed over the substrate 21 and partly etched, so that the conductive layer 71 is formed. Then, the insulating layer 72 is formed to cover the conductive layer 71. Then, a semiconductor film is formed over the insulating layer 72 and partly etched, so that the semiconductor layer 73 having an island shape is formed. Next, a conductive film is formed to cover the insulating layer 72 and the semiconductor layer 73 and partly etched, so that the conductive layers 74 and 75 are formed. In this manner, the transistors 51 and 52 can be formed over the substrate 21.

Then, the insulating layer 76 is formed to cover the transistors 51 and 52. An inorganic insulating film can be used for the insulating layer 76.

Then, the insulating layer 61 is formed over the insulating layer 76. For the insulating layer 61, an organic insulating film functioning as a planarization film is preferably used.

Figure 5B:
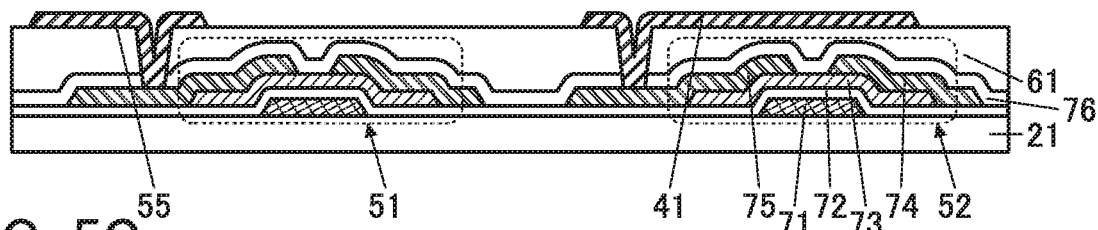

Next, openings that reach the conductive layer 75 are formed in the insulating layers 61 and 76. After that, a conductive film to be the conductive layers 55 and 41 is formed over the insulating layer 61 and partly etched, so that the conductive layers 55 and 41 can be formed (FIG. 5B).

Figure 5C:
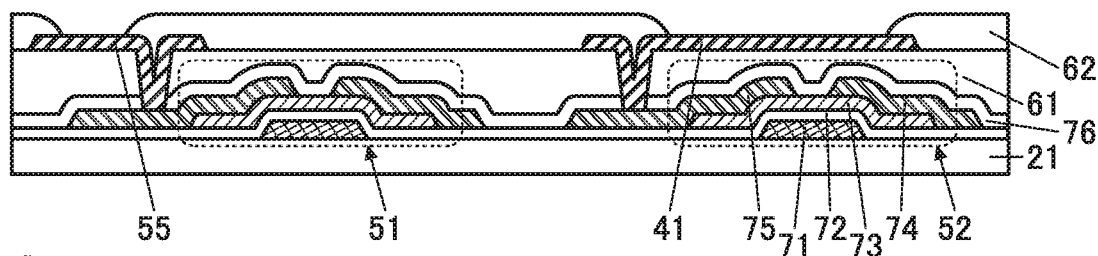

Next, the insulating layer 62 that covers the end portions of the conductive layers 55 and 41 is formed (FIG. 5C). The insulating layer 62 is preferably formed using a photosensitive organic resin.

Figure 5D:
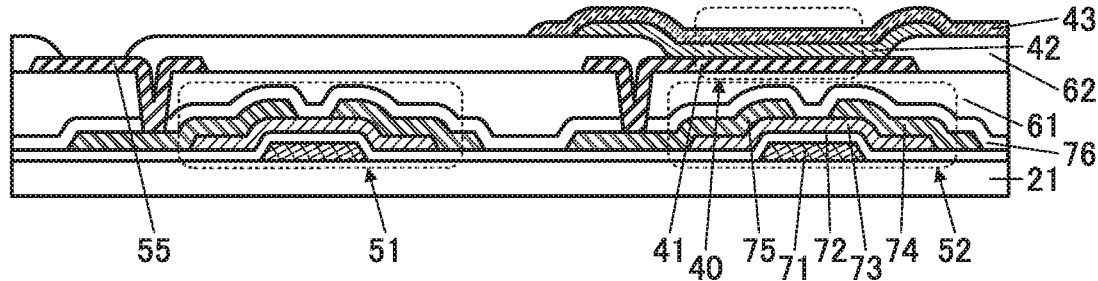

Then, the EL layer 42 and the conductive layer 43 are formed (FIG. 5D).

The EL layer 42 can be formed by an evaporation method, a coating method, a printing method, a discharge method, or the like. In the case where the EL layer 42 is formed for each pixel, an evaporation method using a shadow mask such as a metal mask, an ink-jet method, or the like can be used. In the case of sharing the EL layer 42 by some pixels, an evaporation method not using a metal mask can be used.

The conductive layer 43 can be formed by an evaporation method, a sputtering method, or the like. The conductive layer 43 is preferably formed to cover the end portion of the EL layer 42.

The EL layer 42 and the conductive layer 43 are formed not to be positioned in a region to be the display portion 11. For example, in the case where the EL layer 42 is formed by an evaporation method and the conductive layer 43 is formed by an evaporation method or a sputtering method, it is preferable that an opening be formed in a region where the EL layer 42 and the conductive layer 43 are formed, and then these layers be formed using a shadow mask that covers the region to be the display portion 11. Alternatively, the EL layer 42 may be formed to have an island shape by an ink-jet method, an evaporation method using a metal mask, or the like, and the conductive layer 43 may be formed by an evaporation method, a sputtering method, or the like using a shadow mask.

In the above manner, the light-emitting element 40 can be fabricated. The light-emitting element 40 is a top-emission light-emitting element that emits light to the side opposite to the formation surface side. Note that the light-emitting element 40 may be a top-emission, bottom-emission, or dual-emission light-emitting element. A conductive film that transmits visible light is used as the electrode through which light is extracted. A conductive film that reflects visible light is preferably used as the electrode through which light is not extracted.

Figure 5E:
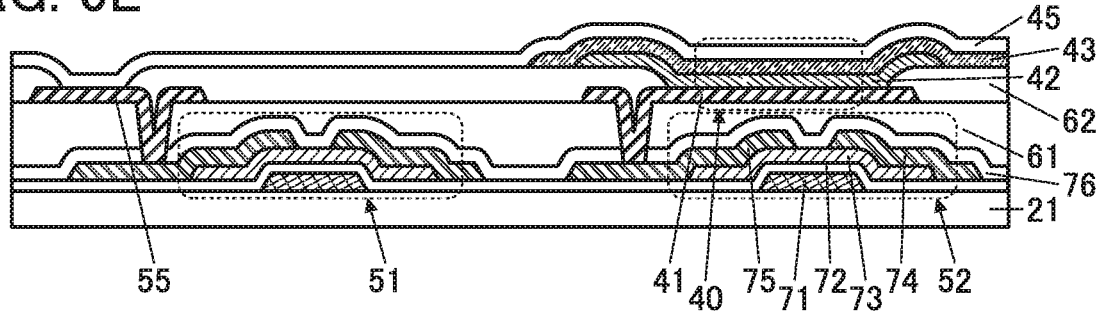

Next, the insulating layer 45 that covers the light-emitting element 40 and the insulating layer 62 is formed (FIG. 5E).

The insulating layer 45 functions as a protective layer that inhibits diffusion of impurities such as water into the light-emitting element 40. The light-emitting element 40 is sealed with the insulating layer 45. After the conductive layer 43 is formed, the insulating layer 45 is preferably formed without exposure to the air.

The insulating layer 45 is formed at a substrate temperature lower than or equal to the upper temperature limit of the EL layer 42. The insulating layer 45 is preferably formed by a sputtering method, a CVD method, an ALD method, a PLD method, or the like. An ALD method and a sputtering method are particularly preferable because a film can be easily formed at low temperature. Furthermore, an ALD method can be suitably used for the formation of the insulating layer 45 because a film with good step coverage and few defects can be formed.

As illustrated in FIG. 5E, the insulating layer 45 is provided partly in contact with a top surface of the conductive layer 55.

Figure 6A:
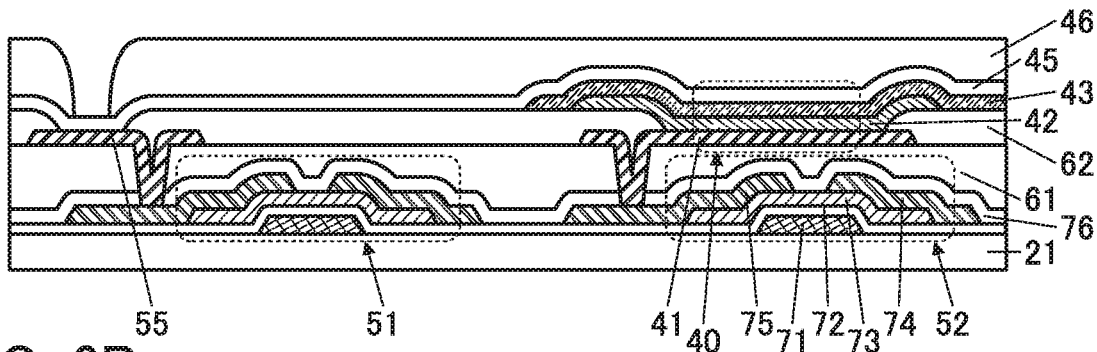
FIGS. 6A to 6D illustrate an example of a method for fabricating a display device.

Next, the insulating layer 46 functioning as a planarization film is formed over the insulating layer 45 (FIG. 6A).

The insulating layer 46 is provided to have an opening overlapping with the conductive layer 55. The insulating layer 46 is preferably formed using a photosensitive organic resin like the insulating layer 62.

Figure 6B:
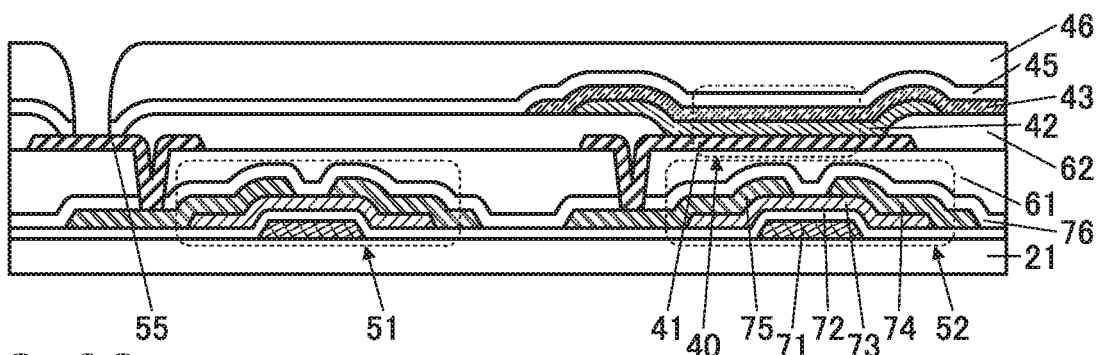

Then, part of the insulating layer 45 not covered with the insulating layer 46 is etched, so that a surface of the conductive layer 55 is partly exposed (FIG. 6B). At this time, the insulating layer 46 functions as a resist mask used for the etching of the insulating layer 45.

Figure 6C:
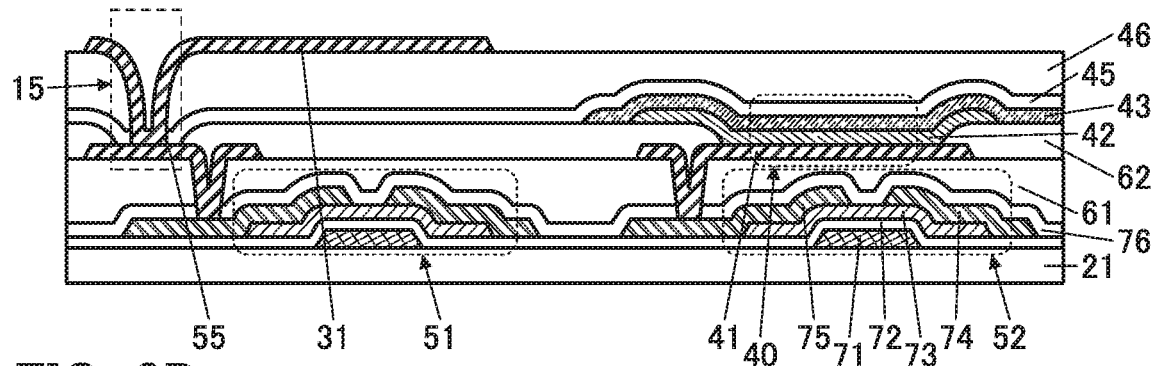

Next, a conductive film is formed over the insulating layer 46 and partly etched, so that the conductive layer 31 is formed (FIG. 6C). Thus, the connection portion 15 where the conductive layers 31 and 55 are electrically connected to each other is formed.

Figure 6D:
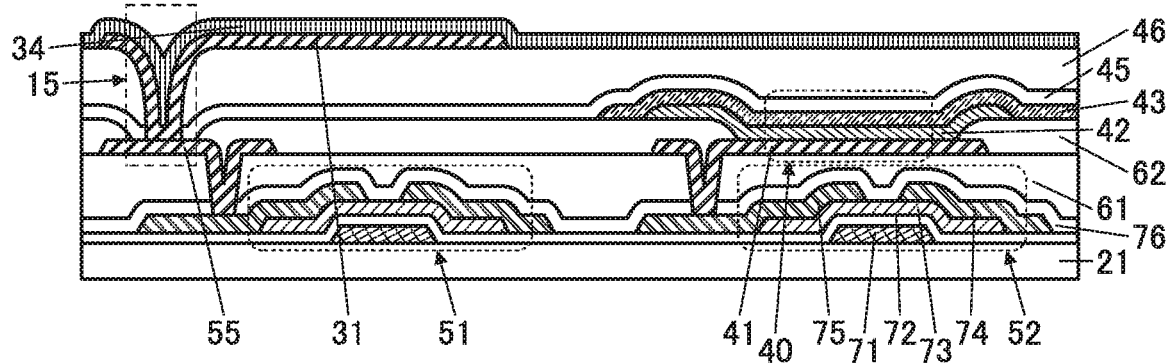

Next, the alignment film 34 is formed over the conductive layer 31 and the insulating layer 46 (FIG. 6D). The alignment film 34 can be formed by performing rubbing treatment after a thin film of a resin or the like is formed.

The above is the description of the fabrication process on the substrate 21 side. Next, the fabrication process on the substrate 22 side will be described. The fabrication process on the substrate 21 side and that on the substrate 22 side can be performed independently.

Figure 7A:
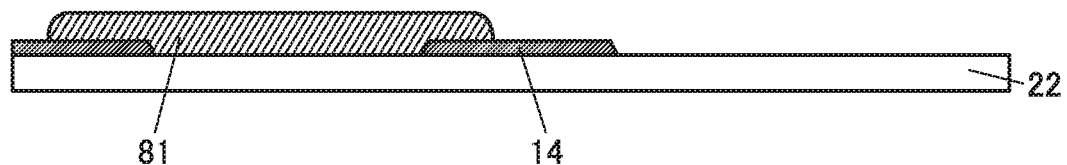
FIGS. 7A to 7D illustrate an example of a method for fabricating a display device.

The light-blocking layer 14 and the coloring layer 81 are formed over the substrate 22 (FIG. 7A).

First, the light-blocking layer 14 is formed over the substrate 22, and then the coloring layer 81 is formed to overlap with the opening in the light-blocking layer 14 and the conductive layer 31.

Figure 7B:
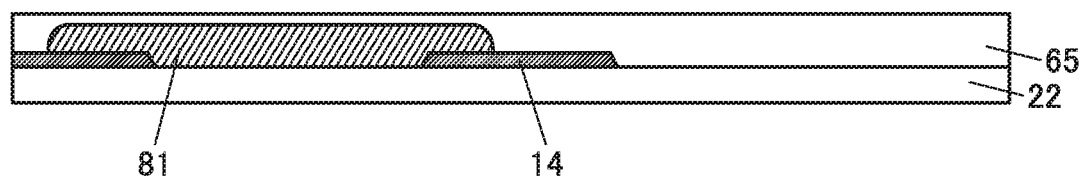

Next, the insulating layer 65 is formed to cover the substrate 22, the light-blocking layer 14, and the coloring layer 81 (FIG. 7B). The insulating layer 65 functions as an overcoat that prevents diffusion of components included in the coloring layer 81 and the like into the liquid crystal layer. The insulating layer 65 functions also as a planarization film. The insulating layer 65 can be formed using an organic resin.

Then, the conductive layer 33 is formed over the insulating layer 65. The conductive layer 33 can be formed by etching part of a conductive film that transmits visible light.

Figure 7C:
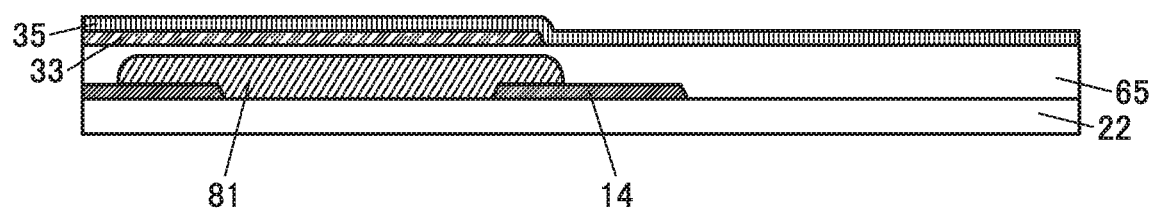

Next, the alignment film 35 is formed over the conductive layer 33 and the insulating layer 65 (FIG. 7C). The alignment film 35 can be formed by a method similar to that of the alignment film 34.

The above is the description of the fabrication process on the substrate 22 side.

Figure 7D:
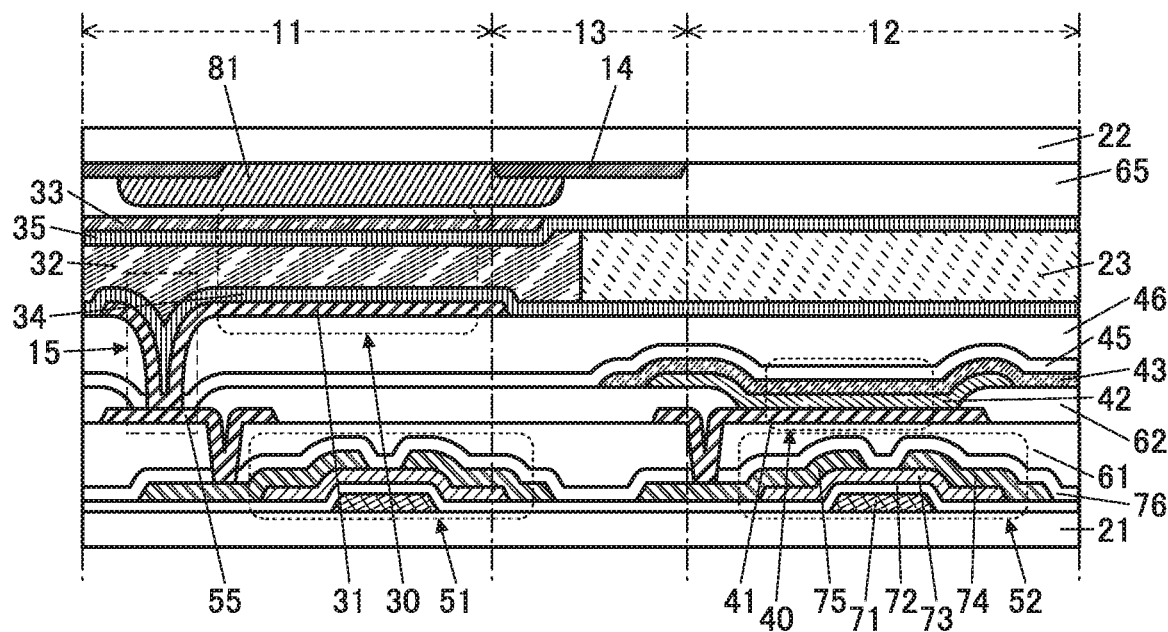

Lastly, the substrates 21 and 22 are bonded to each other with the adhesive layer 23 and the liquid crystal layer 32 sandwiched therebetween (FIG. 7D).

First, the adhesive layer 23 is formed over one or both of the substrates 21 and 22. The adhesive layer 23 is formed to surround a region where the liquid crystal element 30 is formed. At this time, the adhesive layer 23 is preferably formed in a region overlapping with the light-emitting element 40. The adhesive layer 23 can be formed by a screen printing method, a dispensing method, or the like. As the adhesive layer 23, a variety of curable adhesives such as a reactive curable adhesive, a thermosetting adhesive, an anaerobic adhesive, and a photocurable adhesive such as an ultraviolet curable adhesive can be used. Alternatively, a resin which is cured when heated after pre-cured by ultraviolet light or the like may be used. Alternatively, a thermosetting and ultraviolet curable resin or the like may be used for the adhesive layer 23. Alternatively, an adhesive sheet or the like may be used as the adhesive layer 23.

Next, a composition to be the liquid crystal layer 32 is dripped in a region surrounded by the adhesive layer 23 of the substrate 21 or 22 by a dispensing method or the like.

Then, the substrates 21 and 22 are bonded to each other such that the composition to be the liquid crystal layer 32 is sandwiched therebetween, and the adhesive layer 23 is cured. The bonding is preferably performed in a reduced-pressure atmosphere because air bubbles and the like can be prevented from entering a region between the substrate 21 and the substrate 22. After the substrates 21 and 22 are bonded to each other, the adhesive layer 23 is cured.

Note that the composition to be the liquid crystal layer 32 may be injected in a reduced-pressure atmosphere through a gap formed in the adhesive layer 23 after the substrates 21 and 22 are bonded to each other. In addition, after the composition to be the liquid crystal layer 32 is dripped, particulate gap spacers may be dispersed in a region where the pixel is provided or outside the region, or a composition containing the gap spacers may be dripped.

A sealing layer surrounding the liquid crystal layer 32 may be provided between the liquid crystal layer 32 and the adhesive layer 23. In this case, the sealing layer is formed to surround the region where the liquid crystal layer 32 is provided, and the adhesive layer 23 is formed outside the sealing layer. Then, the composition to be the liquid crystal layer 32 is dripped in the region surrounded by the sealing layer, and the substrates 21 and 22 are bonded to each other. After that, the sealing layer is irradiated with ultraviolet rays or the like to be pre-cured while the region to be the display portions 11 and 12 is shielded, and then heat treatment is performed to cure the adhesive layer 23 and the sealing layer. Thus, the light-emitting element 40 is not irradiated with ultraviolet rays, so that the reliability of the light-emitting element 40 can be increased. Furthermore, the sealing layer can be surely cured even when heat treatment is performed at temperature lower than the upper temperature limit of the light-emitting element 40 (e.g., lower than or equal to 120° C., preferably lower than or equal to 100° C.), so that the reliability of the liquid crystal element 30 can also be increased.

The substrates 21 and 22 are bonded to each other, whereby the liquid crystal element 30 is formed. Through the above steps, the display device 10B can be fabricated.

According to one embodiment of the present invention, the transistor 52 connected to the light-emitting element 40, the transistor 51 for driving the liquid crystal element, and the transistor included in the pixel, the driver circuit, or the like can be fabricated through the same process; thus, a multifunctional display device can be fabricated at low cost.

The above is the description of the fabrication method example.

Metal Oxide

A metal oxide that can be used for the semiconductor layer will be described below.

Note that in this specification and the like, a metal oxide containing nitrogen is also referred to as a metal oxide in some cases. A metal oxide containing nitrogen may be referred to as a metal oxynitride. For example, a metal oxide containing nitrogen, such as zinc oxynitride (ZnON), may be used for the semiconductor layer.

Note that in this specification and the like, "c-axis aligned crystal (CAAC)" or "cloud-aligned composite (CAC)" might be stated. Note that CAAC refers to an example of a crystal structure, and CAC refers to an example of a function or a material composition.

For example, a cloud-aligned composite oxide semiconductor (CAC-OS) can be used for the semiconductor layer.

A CAC-OS or a CAC metal oxide has a conducting function in part of the material and has an insulating function in another part of the material; as a whole, the CAC-OS or the CAC metal oxide has a function of a semiconductor. In the case where the CAC-OS or the CAC metal oxide is used for a semiconductor layer of a transistor, the conducting function is to allow electrons (or holes) serving as carriers to flow, and the insulating function is to not allow electrons serving as carriers to flow. By the complementary action of the conducting function and the insulating function, a switching function (On/Off function) can be given to the CAC-OS or the CAC-metal oxide. In the CAC-OS or the CAC metal oxide, separation of the functions can maximize each function.

The CAC-OS or the CAC metal oxide includes conductive regions and insulating regions. The conductive regions have the above-described conducting function, and the insulating regions have the above-described insulating function. In some cases, the conductive regions and the insulating regions in the material are separated at the nanoparticle level. Furthermore, in some cases, the conductive regions and the insulating regions are unevenly distributed in the material. The conductive regions are sometimes observed to be coupled in a cloud-like manner with their boundaries blurred.

In the CAC-OS or the CAC metal oxide, the conductive regions and the insulating regions each have a size greater than or equal to 0.5 nm and less than or equal to 10 nm, preferably greater than or equal to 0.5 nm and less than or equal to 3 nm and are dispersed in the material, in some cases.

The CAC-OS or the CAC metal oxide includes components having different bandgaps. For example, the CAC-OS or the CAC metal oxide includes a component having a wide gap due to the insulating region and a component having a narrow gap due to the conductive region. In the case of such a composition, carriers mainly flow in the component having a narrow gap. The component having a narrow gap complements the component having a wide gap, and carriers also flow in the component having a wide gap in conjunction with the component having a narrow gap. Therefore, in the case where the above-described CAC-OS or CAC metal oxide is used for a channel formation region of a transistor, high current drive capability in the on state of the transistor, that is, high on-state current and high field-effect mobility, can be obtained.

In other words, the CAC-OS or the CAC metal oxide can also be referred to as a matrix composite or a metal matrix composite.

An oxide semiconductor (metal oxide) is classified into a single crystal oxide semiconductor and a non-single-crystal oxide semiconductor. Examples of a non-single-crystal oxide semiconductor include a c-axis aligned crystalline oxide semiconductor (CAAC-OS), a polycrystalline oxide semiconductor, a nanocrystalline oxide semiconductor (nc-OS), an amorphous-like oxide semiconductor (a-like OS), and an amorphous oxide semiconductor.

The CAAC-OS has c-axis alignment, its nanocrystals are connected in the a-b plane direction, and its crystal structure has distortion. Note that distortion refers to a portion where the direction of a lattice arrangement changes between a region with a uniform lattice arrangement and another region with a uniform lattice arrangement in a region where the nanocrystals are connected.

The shape of the nanocrystal is basically a hexagon but is not always a regular hexagon and is a non-regular hexagon in some cases. Furthermore, a pentagonal or heptagonal lattice arrangement, for example, is included in the distortion in some cases. Note that it is difficult to observe a clear crystal grain boundary (also referred to as grain boundary) even in the vicinity of distortion in the CAAC-OS. That is, a lattice arrangement is distorted and thus formation of a grain boundary is inhibited. This is because the CAAC-OS can tolerate distortion owing to a low density of oxygen atom arrangement in the a-b plane direction, a change in interatomic bond distance by substitution of a metal element, and the like.

Furthermore, the CAAC-OS tends to have a layered crystal structure (also referred to as a layered structure) in which a layer containing indium and oxygen (hereinafter, In layer) and a layer containing the element M, zinc, and oxygen (hereinafter, (M,Zn) layer) are stacked. Note that indium and the element M can be replaced with each other, and when the element M of the (M, Zn) layer is replaced with indium, the layer can be referred to as an (In, M, Zn) layer. When indium of the In layer is replaced with the element M, the layer can be referred to as an (In, M) layer. The CAAC-OS is a metal oxide with high crystallinity. By contrast, in the CAAC-OS, a reduction in electron mobility due to a grain boundary is less likely to occur because it is difficult to observe a clear grain boundary. Entry of impurities, formation of defects, or the like might decrease the crystallinity of a metal oxide. This means that the CAAC-OS has small amounts of impurities and defects (e.g., oxygen vacancies (Vo)). Thus, a metal oxide including the CAAC-OS is physically stable. Accordingly, the metal oxide including the CAAC-OS is resistant to heat and has high reliability.

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. There is no regularity of crystal orientation between different nanocrystals in the nc-OS. Thus, the orientation in the whole film is not observed. Accordingly, in some cases, the nc-OS cannot be distinguished from an a-like OS or an amorphous oxide semiconductor, depending on an analysis method.

Indium-gallium-zinc oxide (hereinafter referred to as IGZO) that is a kind of metal oxide containing indium, gallium, and zinc has a stable structure in some cases when formed of the above-described nanocrystals. In particular, IGZO crystals tend not to grow in the air and thus, a stable structure is obtained when IGZO is formed of smaller crystals (e.g., the above-described nanocrystals) rather than larger crystals (here, crystals with a size of several millimeters or several centimeters).

The a-like OS is a metal oxide having a structure between that of the nc-OS and that of the amorphous oxide semiconductor. The a-like OS has a void or a low-density region. That is, the a-like OS has low crystallinity as compared with the nc-OS and the CAAC-OS.

An oxide semiconductor (metal oxide) can have various structures that show various different properties. Two or more of the amorphous oxide semiconductor, the polycrystalline oxide semiconductor, the a-like OS, the nc-OS, and the CAAC-OS may be included in an oxide semiconductor of one embodiment of the present invention.

A metal oxide film that functions as a semiconductor layer can be formed using either or both of an inert gas and an oxygen gas. Note that there is no particular limitation on the flow rate ratio of oxygen (the partial pressure of oxygen) at the time of forming the metal oxide film. However, to obtain a transistor having high field-effect mobility, the flow rate ratio of oxygen (the partial pressure of oxygen) at the time of forming the metal oxide film is preferably higher than or equal to 0% and lower than or equal to 30%, further preferably higher than or equal to 5% and lower than or equal to 30%, still further preferably higher than or equal to 7% and lower than or equal to 15%.

The energy gap of the metal oxide is preferably 2 eV or more, further preferably 2.5 eV or more, still further preferably 3 eV or more. With the use of a metal oxide having such a wide energy gap, the off-state current of the transistor can be reduced.

The substrate temperature during the formation of the metal oxide film is preferably lower than or equal to 350° C., further preferably higher than or equal to room temperature and lower than or equal to 200° C., and still further preferably higher than or equal to room temperature and lower than or equal to 130° C. The substrate temperature during the formation of the metal oxide film is preferably room temperature, because productivity can be increased.

The metal oxide film can be formed by a sputtering method. Alternatively, a PLD method, a PECVD method, a thermal CVD method, an ALD method, a vacuum evaporation method, or the like may be used.

The above is the description of the metal oxide.

At least part of this embodiment can be implemented in combination with any of the other embodiments described in this specification as appropriate.

Embodiment 2

In this embodiment, structure examples of a display module and an electronic device for which the display device of one embodiment of the present invention can be used will be described.

Figure 8A:
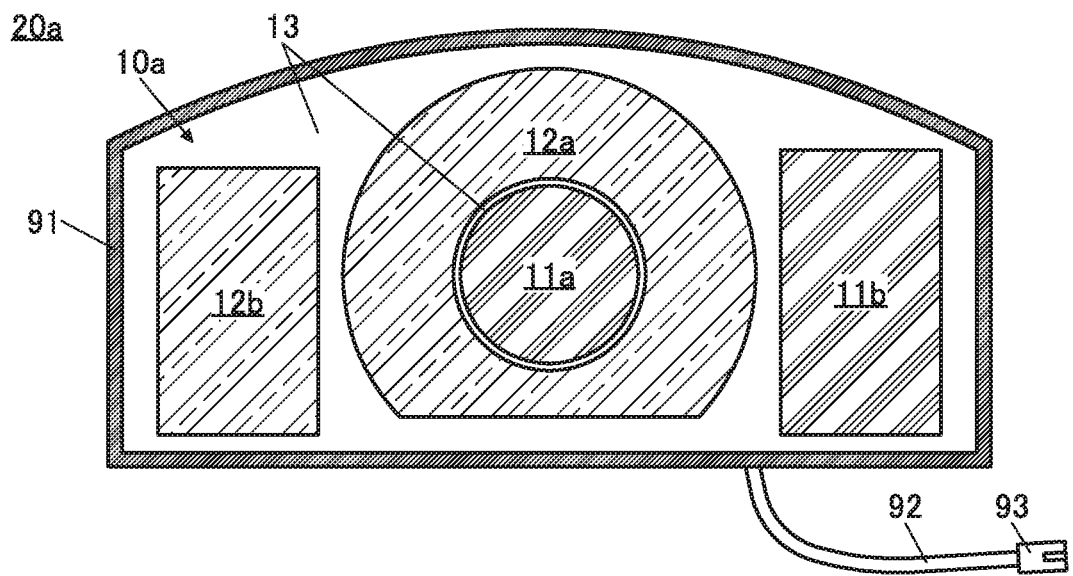
FIGS. 8A and 8B illustrate a structure example of a display module.

FIG. 8A illustrates a structure example of a display module 20a. The display module 20a includes an exterior body 91 into which a display device 10a is incorporated, a cable 92, a connector 93, and the like. The display module 20a can be incorporated into a moving object such as a car.

The display device 10a includes a display portion 11a, a display portion 11b, a display portion 12a, a display portion 12b, the non-display portions 13, and the like. The non-display portions 13 are provided between the display portions. Part of the non-display portions 13 is provided along the outline of the display device 10a.

The display portions 11a and 11b each have a function of displaying an image using a liquid crystal element. The display portions 11a and 11b preferably display an image utilizing reflected light. The display portions 11a and 11b are suitable for displaying a still image or a moving image with gradual change.

In contrast, the display portions 12a and 12b each have a function of displaying an image utilizing light emitted from a light-emitting element. The display portions 12a and 12b are suitable for displaying a vivid still image, a vivid moving image, a moving image with fast motions, a high-contrast still image, a high-contrast moving image, or the like.

The connector 93 can be connected to a connector included in a moving object or the like. A power source potential and various signals can be supplied from the moving object to the display device 10a through the connector 93 and the cable 92.

Figure 8B:
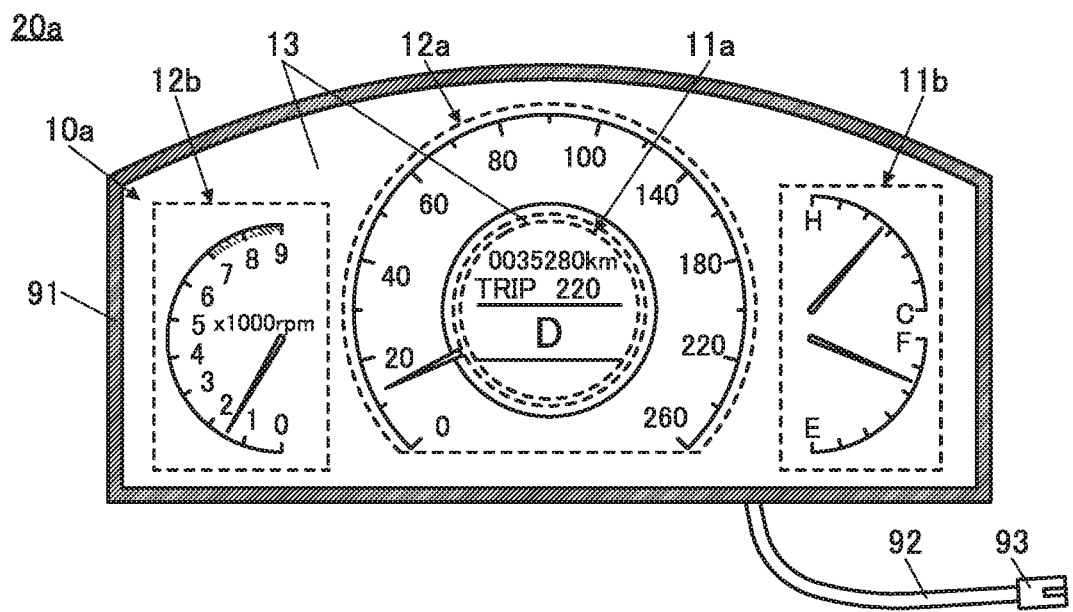

When positioned to be seen from a driver in the moving object, the display module 20a can provide various kinds of information for the driver. FIG. 8B illustrates an example of a display state of the display module 20a.

The display portion 11a displays an image showing mileage and a transmission state. In FIG. 8B, an odometer showing total mileage (shown as "0035280 km" in FIG. 8B) and a tripmeter showing section mileage (shown as "TRIP 220" in FIG. 8B) are displayed as the mileage information.

In addition, "D" is displayed as the information of the transmission state, which indicates the transmission is in the driving mode.

The display portion 11b displays an image of a water temperature meter showing the water temperature of cooling water and an image of a fuel meter showing the remaining amount of fuel. In FIG. 8B, scales, a hand, a character "H" indicating high temperature, and a character "C" indicating low temperature are displayed in the image of the water temperature meter. In addition, scales, a hand, a character "F" indicating a full tank of fuel, and a character "E" indicating an empty tank of fuel are displayed in the image of the fuel meter. In the images of the water temperature meter and the fuel meter, only the images of hands are gradually changed, and the other images can be constantly displayed without change. Note that an image whose color changes in accordance with the water temperature or the remaining amount of fuel may be displayed.

In this manner, the display portions 11a and 11b can suitably display an image providing information with gradual change. In addition, the display portions 11a and 11b can perform display at an extremely low frequency (e.g., 1 Hz or lower), whereby the power consumption can be reduced.

The display portion 12a displays an image of a speed meter. The display portion 12b displays an image of a tachometer showing the rotation speed of the engine. In FIG. 8B, scales numbered from 0 to 260 indicating speed and a hand are displayed in the image of the speed meter. In addition, scales numbered from 0 to 9 indicating the rotation speed, a hand, and characters "×1000 rpm" indicating the coefficient of the scales are displayed in the image of the tachometer. In the images of the speed meter and the tachometer, only the images of hands are changed as needed in accordance with the speed or the rotation speed, and the other images can be constantly displayed without change. Note that an image whose color changes in accordance with the speed or the rotation speed may be displayed.

In this manner, the display portions 12a and 12b can suitably display an image providing information with large change. The display portions 12a and 12b preferably perform display at a high frame frequency (e.g., 60 Hz or higher and 480 Hz or lower) because information can be displayed in real time without delay with respect to rapid change in speed or rotation speed.

Figure 9A:
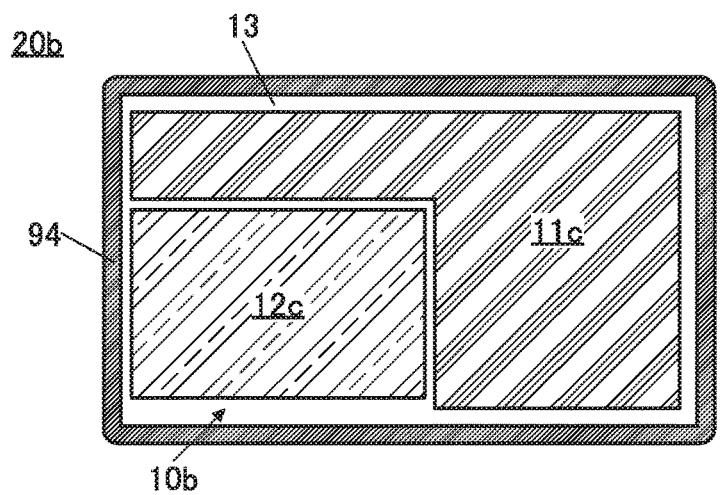
FIGS. 9A and 9B illustrates a structure example of an electronic device.

FIG. 9A illustrates a structure example of an electronic device 20b functioning as an electronic tag. The electronic device 20b includes an exterior body 94 into which a display device 10b is incorporated. The display device 10b includes a display portion 11c, a display portion 12c, and the non-display portion 13. The display portion 11c has a function of displaying an image using a liquid crystal element, and the display portion 12c has a function of displaying an image using a light-emitting element.

The electronic device 20b can include a battery, a memory, a communication circuit, a control circuit, and the like in the exterior body 94. The exterior body 94 may include a terminal for charging and data rewriting. The electronic device 20b can be used as an electronic shipping tag or the like. The electronic device 20b can repeatedly display image data retained in the memory. Image data retained in the memory can be updated to data that is input through the terminal or the communication circuit. Alternatively, image data input from the outside through the communication circuit may be displayed in real time.

Figure 9B:
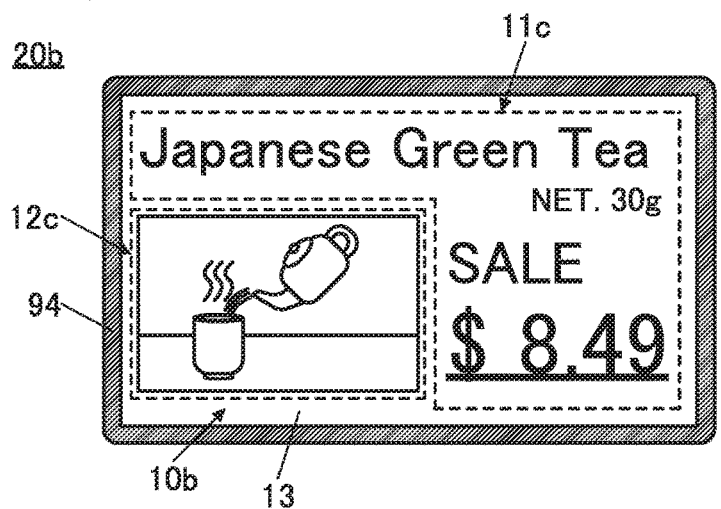

FIG. 9B illustrates an example of a display state of the electronic device 20b. In the example shown here, the electronic device 20b is used as a price tag.

The display portion 11c can display product information such as a name, a price, a production area, ingredients, and contents. The information is preferably displayed on the display portion 11c as a still image or a moving image with gradual change. In FIG. 9B, characters "Japanese Green Tea" that are the product name information, characters "NET. 30 g" that are the contents information, characters "SALE", and characters "$8.49" that are the price information are displayed on the display portion 11c.

The display portion 12c can display an image including information of at least one of a product and the usage of the product. The image displayed on the display portion 12c may be a still image, but is preferably a moving image. Displaying a moving image on the display portion 12c enables plain explanation of the product usage, effective appeal of the selling point of the product, and the like. When the product is a food material, the display portion 12c may display a moving image showing how to make a dish using the food material. In addition, the display portion 12c can display a commercial video.

FIG. 9B illustrates an example in which the display portion 12c displays a video explaining how to brew delicious Japanese green tea with a teapot. This can encourage a purchase from a user, who is interested in but unfamiliar with Japanese green tea and thus hesitates to purchase it.

The display portions 11c or 12c may display a code such as a bar code or a two-dimensional code. A user can obtain more specific information on the product by reading the code with a terminal such as a smartphone. Furthermore, the user can make a payment for the product by reading the code with the terminal.

Figure 9C:
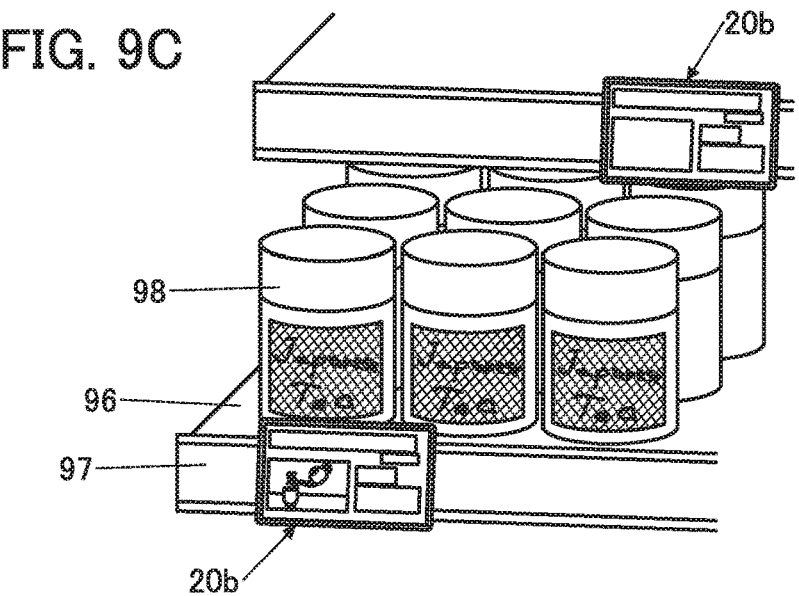
FIG. 9C illustrates an example of a usage state of the electronic device.

FIG. 9C illustrates an example of a usage state of the electronic device 20b. In FIG. 9C, the electronic device 20b is provided on a rail 97 attached to a display shelf 96. A plurality of products 98 are displayed on the display shelf 96.

The electronic device 20b can be fixed by being hooked on the rail 97. The rail 97 may have a function of supplying power to the electronic device 20b. In addition, image data may be transmitted to the electronic device 20b through the rail 97.

With the use of the display device of one embodiment of the present invention in this manner, an image can be displayed by a display method suitable for the kind of the image to be displayed. In addition, since the power is consumed suitably in accordance with the kind of the image to be displayed or the display method thereof, unnecessary power consumption can be reduced.

At least part of this embodiment can be implemented in combination with any of the other embodiments described in this specification as appropriate.

Embodiment 3

In this embodiment, a display device including a semiconductor device of one embodiment of the present invention will be described with reference to FIGS. 10A to 10C.

Figure 10A:
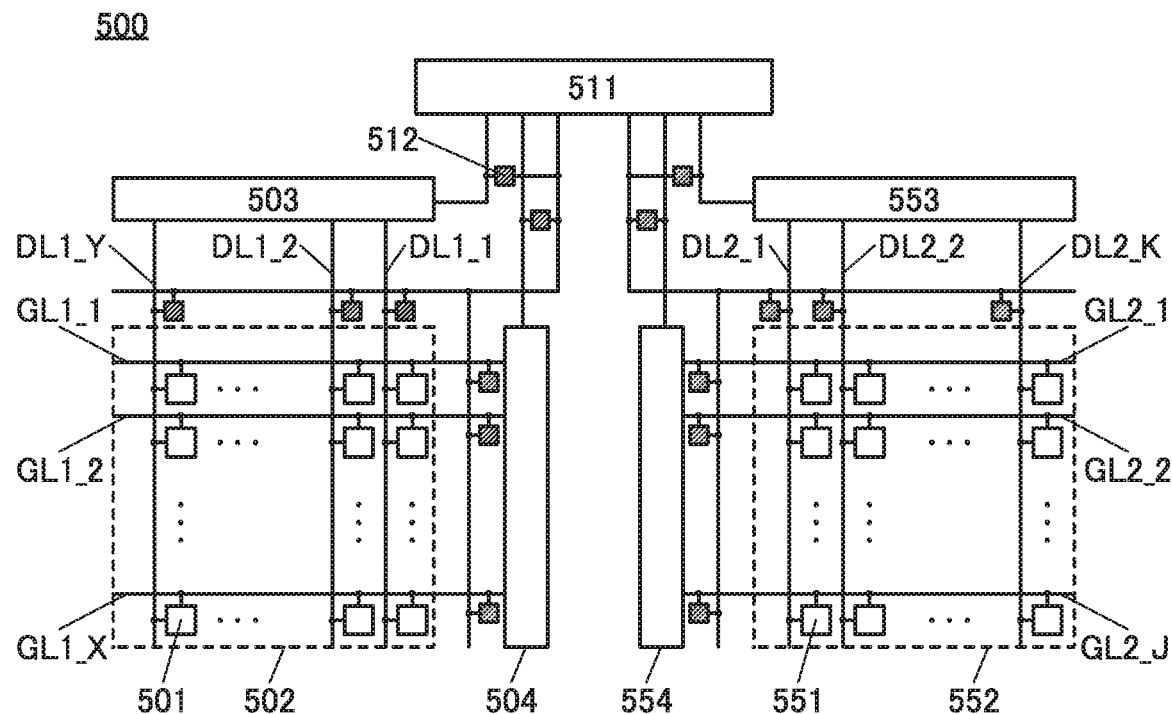
FIG. 10A is a block diagram of a display device.

A display device 500 illustrated in FIG. 10A includes two pixel portions (a pixel portion 502 and a pixel portion 552) including different display elements. Although the example in which two pixel portions are provided is illustrated here, three or more pixel portions may be provided. The pixel portions 502 and 552 each function as a display portion.

The display device 500 includes the pixel portion 502, a driver circuit 503, a driver circuit 504, the pixel portion 552, a driver circuit 553, a driver circuit 554, a terminal portion 511, and a protection circuit 512. Note that the protection circuit 512 is not necessarily provided.

A transistor including a metal oxide of one embodiment of the present invention can be used for the pixel portion 502, the driver circuit 504, the pixel portion 552, and the driver circuit 554. Furthermore, the transistor including the metal oxide of one embodiment of the present invention may be used for at least one of the protection circuit 512, the driver circuit 503, and the driver circuit 553.

The pixel portion 502 includes a plurality of pixel circuits 501 arranged in X rows and Y columns (X and Y independently represent a natural number of 2 or more). Each of the pixel circuits 501 includes a circuit for driving a liquid crystal element.

The driver circuit 504 functions as a gate driver that outputs a scan signal to a gate line GL1_1 to a gate line GL1_X. The driver circuit 503 functions as a source driver that supplies a data signal to a data line DL1_1 to a data line DL1_Y.

The pixel portion 552 includes a plurality of pixel circuits 551 arranged in J rows and K columns (J and K independently represent a natural number of 2 or more). Each of the pixel circuits 551 includes a circuit for driving a light-emitting element.

The driver circuit 554 functions as a gate driver that outputs a scan signal to a gate line GL2_1 to a gate line GL2_J. The driver circuit 553 functions as a source driver that supplies a data signal to a data line DL2_1 to a data line DL2_K.

The driver circuits 504 and 554 each include at least a shift register. The driver circuits 503 and 553 are each composed of a plurality of analog switches, for example. Alternatively, the driver circuits 503 and 553 may each be composed of a shift register and the like.

The terminal portion 511 is a portion having terminals for inputting power, control signals, image signals, and the like to the display device 500 from external circuits. The terminal portion 511 is electrically connected to the driver circuits 503, 504, 553, and 554 through their respective wirings. In this manner, signals and the like for driving the plurality of pixel portions are input through one terminal portion 511, which is preferable as compared with a case where a terminal portion is provided for each pixel portion because wirings and like can be combined into one when the display device 500 is incorporated into an electronic device.

The protection circuit 512 is a circuit which electrically connects a wiring connected to the protection circuit to another wiring when a potential out of a certain range is applied to the wiring connected to the protection circuit. The protection circuits 512 illustrated in FIG. 10A are connected to the wirings, the gate lines, and the data lines that connect the terminal portion 511 and the driver circuit 503 and the like. Note that in FIG. 10A, the protection circuit 512 is hatched to be distinguished from the pixel circuits 501 and 551.

Each of the driver circuits 503, 504, 553, and 554 may be provided over the same substrate as the pixel portions 502 and 552. Alternatively, an IC chip including a substrate provided with a gate driver circuit or a source driver (e.g., a driver circuit board formed using a single crystal semiconductor or a polysilicon semiconductor) may be mounted on the substrate provided with the pixel portions 502 and 552, or an FPC connected to the terminal portion 511.

Figure 10B:
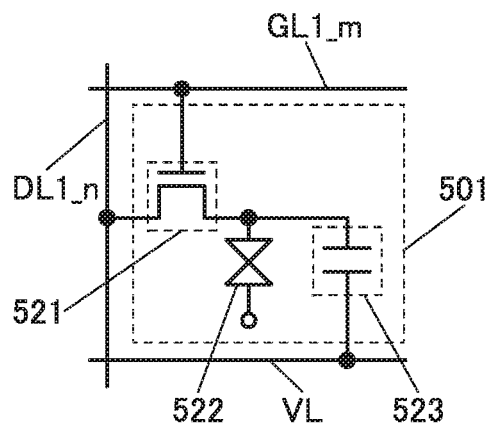
FIGS. 10B and 10C are circuit diagrams of the display device.

FIG. 10B illustrates a configuration example of a pixel circuit that can be used as the pixel circuit 501. FIG. 10C illustrates a configuration example of a pixel circuit that can be used as the pixel circuit 551.

The pixel circuit 501 illustrated in FIG. 10B includes a transistor 521, a liquid crystal element 522, and a capacitor 523. The pixel circuit 501 is connected to a data line DL1_$n$, a gate line GL1_$m$, a potential supply line VL, and the like.

The potential of one of a pair of electrodes of the liquid crystal element 522 is set in accordance with the specifications of the pixel circuit 501 as appropriate. The alignment state of the liquid crystal element 522 is set depending on written data. A common potential may be supplied to one of the pair of electrodes of the liquid crystal element 522 included in each of the plurality of pixel circuits 501. The potential supplied to the one of the pair of electrodes of the liquid crystal element 522 in the pixel circuit 501 may differ between rows.

Figure 10C:
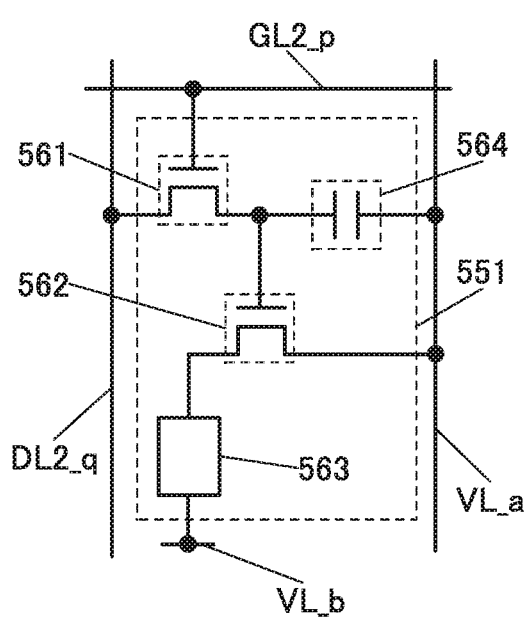

The pixel circuit 551 illustrated in FIG. 10C includes a transistor 561, a transistor 562, a light-emitting element 563, and a capacitor 564. The pixel circuit 551 is connected to a data line DL2_$q$, a gate line G2L_$p$, a potential supply line VL_a, a potential supply line VL_b, and the like.

A high power supply potential VDD is supplied to one of the potential supply lines VL_a and VL_b, and a low power supply potential VSS is supplied to the other. The current flowing through the light-emitting element 563 is controlled in accordance with a potential supplied to a gate of the transistor 562, whereby the luminance of light emitted from the light-emitting element 563 is controlled.

In the display device 500, the pixel portion 502 functions as a display portion that displays an image using the liquid crystal element, and the pixel portion 552 functions as a display portion that displays an image using the light-emitting element. The pixel portion 502 can suitably display a still image or a moving image with relatively small change. The pixel portion 552 can suitably display a moving image with relatively large change.

Here, the frame frequency for displaying an image on the pixel portion 502 is referred to as F1, and the frame frequency for displaying an image on the pixel portion 552 is referred to as F2. At this time, the frame frequency F1 of the pixel portion 502 is preferably lower than the frame frequency F2 of the pixel portion 552. Since the pixel portion 502 can suitably display a still image or a moving image with relatively small change, the power consumption can be reduced by reducing the frame frequency F1 without influence on the display. In contrast, the pixel portion 552 can suitably display a moving image with relatively large change, and thus can display a moving image smoothly when the frame frequency F2 is increased.

Note that the frame frequency F1 of the pixel portion 502 and the frame frequency F2 of the pixel portion 552 may be the same. In this case, image data with the same specifications can be input to the display device 500.

For example, the frame frequency F1 of the pixel portion 502 can be higher than or equal to 0.01 Hz and lower than or equal to 120 Hz. The frame frequency F2 of the pixel portion 552 can be higher than or equal to 30 Hz and lower than or equal to 240 Hz. In addition, it is preferable that one or both of the frame frequency F1 of the pixel portion 502 and the frame frequency F2 of the pixel portion 552 be changeable within the above range in accordance with an input image. For example, on the pixel portion 502, a still image can be displayed with reduced power consumption at a frame frequency of 1 Hz or lower and a moving image can be displayed at a frame frequency of 30 Hz or higher, preferably 60 Hz or higher.

At least part of any of the structure examples, the drawings corresponding thereto, and the like described in this embodiment can be implemented in combination with any of the other structure examples, the other drawings corresponding thereto, and the like as appropriate.

At least part of this embodiment can be implemented in combination with any of the other embodiments described in this specification as appropriate.

Embodiment 4

A pixel circuit including a memory for correcting gray levels displayed by pixels and a display device including the pixel circuit will be described below. Any of the pixel circuits described below can be used for the display portion of the display device of one embodiment of the present invention.

Circuit Configuration

Figure 11A:
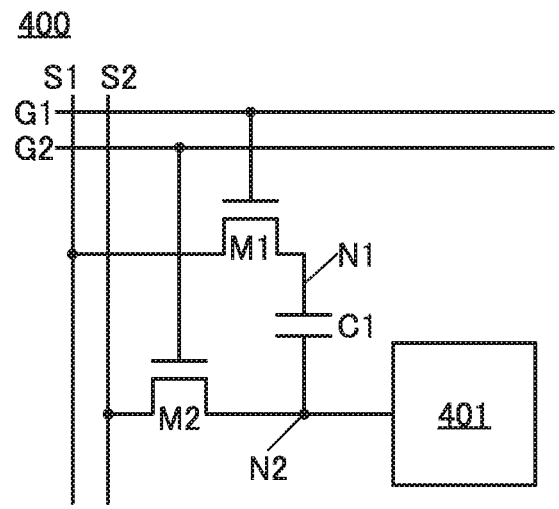
FIGS. 11A, 11C, and 11D are each a circuit diagram of a display device.

FIG. 11A is a circuit diagram of a pixel circuit 400. The pixel circuit 400 includes a transistor M1, a transistor M2, a capacitor C1, and a circuit 401. The pixel circuit 400 is connected to a wiring S1, a wiring S2, a wiring G1, and a wiring G2.

A gate of the transistor M1 is connected to the wiring G1, one of a source and a drain of the transistor M1 is connected to the wiring S1, and the other of the source and the drain of the transistor M1 is connected to one electrode of the capacitor C1. A gate of the transistor M2 is connected to the wiring G2, one of a source and a drain of the transistor M2 is connected to the wiring S2, and the other of the source and the drain of the transistor M2 is connected to the other electrode of the capacitor C1 and the circuit 401.

The circuit 401 includes at least one display element. A variety of display elements can be used, and a light-emitting element such as an organic EL element or an LED element, a liquid crystal element, or an MEMS element can be typically used.

A node where the transistor M1 and the capacitor C1 are connected is referred to as a node N1, and a node where the transistor M2 and the circuit 401 are connected is referred to as a node N2.

In the pixel circuit 400, when the transistor M1 is turned off, the potential of the node N1 can be held. Furthermore, when the transistor M2 is turned off, the potential of the node N2 can be held. A predetermined potential is written to the node N1 through the transistor M1 while the transistor M2 is off, whereby the potential of the node N2 can be changed in accordance with a change in the potential of the node N1 by capacitive coupling through the capacitor C1.

Here, the transistor using an oxide semiconductor in Embodiment 1 can be used as one or both of the transistor M1 and the transistor M2. Accordingly, the potential of the node N1 or the node N2 can be held for a long time owing to an extremely low off-state current. Note that a transistor using a semiconductor such as silicon may be used in the case where the potential of each node is held for a short time (specifically, in the case where the frame frequency is 30 Hz or more, for example).

Driving Method Example

Next, an example of a method for operating the pixel circuit 400 is described with reference to FIG. 11B. FIG.

11B is a timing chart showing operation of the pixel circuit 400. Note that, for easy description, the influences of various kinds of resistance such as wiring resistance, parasitic capacitance of a transistor, a wiring, and the like, the threshold voltage of a transistor, and the like are not taken into consideration.

Figure 11B:
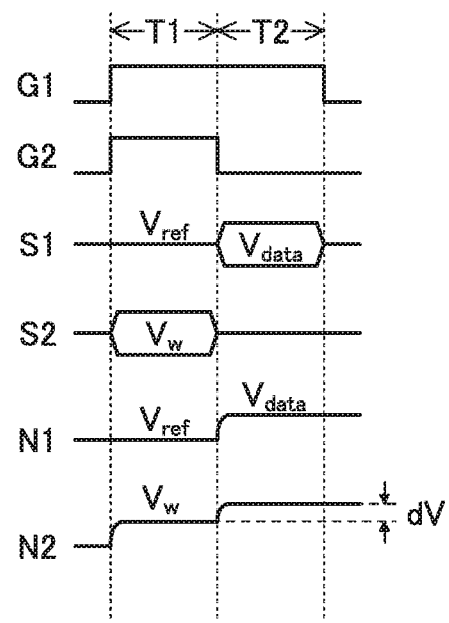
FIG. 11B is a timing chart of the display device.

In the operation shown in FIG. 11B, one frame period is divided into a period T1 and a period T2. The period T1 is a period in which a potential is written to the node N2, and the period T2 is a period in which a potential is written to the node N1.

Period T1

In the period T1, potentials for turning on the transistors are supplied to the wiring G1 and the wiring G2. A potential $V_{ref}$ that is a fixed potential is supplied to the wiring S1 and a first data potential $V_w$ is supplied to the wiring S2.

The potential $V_{ref}$ is supplied from the wiring S1 to the node N1 through the transistor M1. The first data potential $V_w$ is supplied from the wiring S2 to the node N2 through the transistor M2. Thus, a potential difference $V_w - V_{ref}$ is held in the capacitor C1.

Period T2

Then, in the period T2, the potential for turning on the transistor M1 is supplied to the wiring G1, and a potential for turning off the transistor M2 is supplied to the wiring G2. A second data potential $V_{data}$ is supplied to the wiring S1. The wiring S2 may be supplied with a predetermined constant potential or brought into a floating state.

The second data potential $V_{data}$ is supplied from the wiring S1 to the node N1 through the transistor M1. At this time, the potential of the node N2 changes only by a potential dV in accordance with the second data potential $V_{data}$ due to capacitive coupling by the capacitor C1. That is, a potential of the sum of the first data potential $V_w$ and the potential dV is input to the circuit 401. Although the potential dV is a positive value in FIG. 11B, the potential dV may be a negative value. In other words, the second data potential $V_{data}$ may be lower than the potential $V_{ref}$.

Here, the potential dV is mainly determined by the capacitance value of the capacitor C1 and the capacitance value of the circuit 401. When the capacitance value of the capacitor C1 is much higher than the capacitance value of the circuit 401, the potential dV is close to the second data potential $V_{data}$.

As described above, the pixel circuit 400 can generate a potential supplied to the circuit 401 including the display element by combination of two kinds of data signals, so that gray levels can be corrected in the pixel circuit 400.

The pixel circuit 400 can also generate a potential exceeding the maximum potential that the source driver connected to the wiring S1 and the wiring S2 can supply. For example, in the case of using a light-emitting element, high-dynamic-range (HDR) display or the like can be performed. In the case of using a liquid crystal element, overdriving or the like can be performed.

APPLICATION EXAMPLE

Example Using Liquid Crystal Element

Figure 11C:
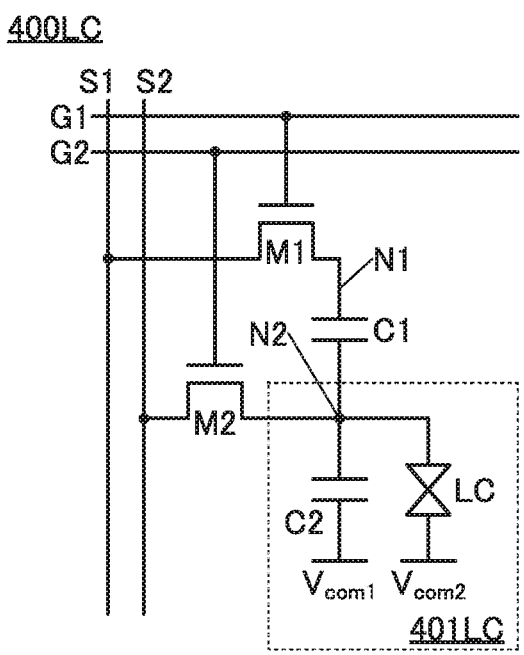

A pixel circuit 400LC illustrated in FIG. 11C includes a circuit 401LC. The circuit 401LC includes a liquid crystal element LC and a capacitor C2.

One electrode of the liquid crystal element LC is connected to the node N2 and one electrode of the capacitor C2, and the other electrode of the liquid crystal element LC is connected to a wiring to which a potential $V_{com2}$ is supplied. The other electrode of the capacitor C2 is connected to a wiring to which a potential $V_{com1}$ is supplied.

The capacitor C2 functions as a storage capacitor. Note that the capacitor C2 is not necessarily provided.

Since a high voltage can be supplied to the liquid crystal element LC in the pixel circuit 400LC, high-speed display by overdriving, use of a liquid crystal material with a high drive voltage, or the like are possible, for example. In addition, a correction signal is supplied to the wiring S1 or the wiring S2, whereby gray levels can be corrected in accordance with an operating temperature, a deterioration level of the liquid crystal element LC, or the like.

Example Using Light-Emitting Element

Figure 11D:
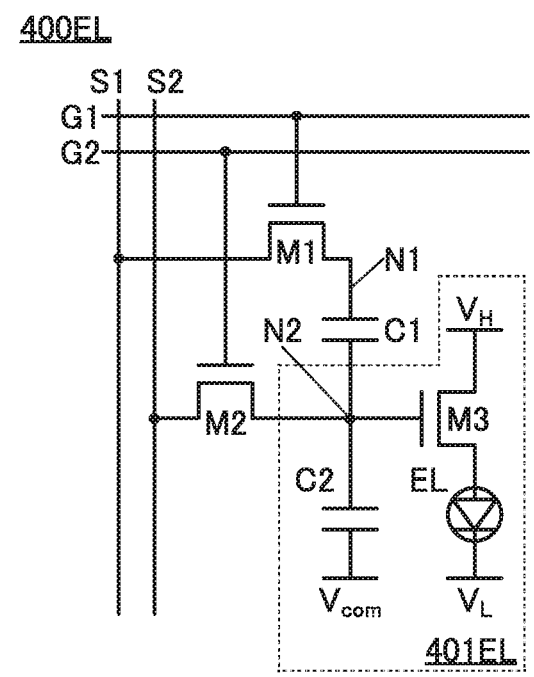

A pixel circuit 400EL illustrated in FIG. 11D includes a circuit 401EL. The circuit 401EL includes a light-emitting element EL, a transistor M3, and the capacitor C2.

A gate of the transistor M3 is connected to the node N2 and one electrode of the capacitor C2, one of a source and a drain of the transistor M3 is connected to a wiring to which a potential $V_H$ is supplied, and the other of the source and the drain of the transistor M3 is connected to one electrode of the light-emitting element EL. The other electrode of the capacitor C2 is connected to a wiring to which a potential $V_{com}$ is supplied. The other electrode of the light-emitting element EL is connected to a wiring to which a potential $V_L$ is supplied.

The transistor M3 has a function of controlling current to be supplied to the light-emitting element EL. The capacitor C2 functions as a storage capacitor. The capacitor C2 is not necessarily provided.

Although the transistor M3 is connected to an anode side of the light-emitting element EL here, the transistor M3 may be connected to a cathode side. In that case, values of the potential $V_H$ and the potential $V_L$ can be changed as appropriate.

A large amount of current can flow in the light-emitting element EL by supplying a high potential to the gate of the transistor M3 in the pixel circuit 400EL, whereby HDR display or the like can be performed. In addition, a correction signal is supplied to the wiring S1 or the wiring S2, whereby variation in electrical characteristics of the transistor M3 or the light-emitting element EL can be corrected.

Note that without limitation to the circuits illustrated in FIGS. 11C and 11D, a transistor, a capacitor, or the like may be added.

At least part of this embodiment can be implemented in combination with any of the other embodiments described in this specification as appropriate.

This application is based on Japanese Patent Application Serial No. 2019-183956 filed with Japan Patent Office on Oct. 4, 2019, the entire contents of which are hereby incorporated by reference.

What is claimed is:

1. A display device comprising:
a first display portion;
a second display portion;
a non-display portion;
a first substrate;
a second substrate,
a plurality of liquid crystal elements arranged in a matrix in the first display portion, and a plurality of light-emitting elements arranged in a matrix in the second display portion, wherein the first display portion and the second display portion are provided apart from each other with the non-display portion therebetween, wherein the first substrate and the second substrate are provided to face each other with the first display portion, the second display portion, and the non-display portion therebetween, wherein one of the plurality of the liquid crystal elements reflects visible light to a second substrate side, and wherein one of the plurality of the light-emitting elements emits visible light to the second substrate side.

2. The display device according to claim 1, further comprising:

a first insulating layer; and a second insulating layer, wherein the first insulating layer is provided to cover the one of the plurality of the light-emitting elements and comprises an inorganic compound, wherein the second insulating layer is provided to cover the first insulating layer and comprises an organic compound, and wherein the one of the plurality of the liquid crystal elements is provided over the second insulating layer.

3. The display device according to claim 2, further comprising:

a first transistor; and a second transistor, wherein the one of the plurality of the liquid crystal elements comprises a first electrode, a liquid crystal layer, and a second electrode from a first substrate side, wherein the one of the plurality of the light-emitting elements comprises a third electrode, a light-emitting layer, and a fourth electrode from the first substrate side, wherein the first electrode is electrically connected to the first transistor, and wherein the third electrode is electrically connected to the second transistor.

4. The display device according to claim 3, further comprising a conductive layer, wherein the conductive layer is provided on the same plane as the third electrode, and wherein the first transistor and the first electrode are electrically connected to each other through the conductive layer.

5. The display device according to claim 1, further comprising a light-blocking layer, wherein the light-blocking layer is positioned in the non-display portion and positioned closer to the second substrate than the one of the plurality of the liquid crystal elements and the one of the plurality of the light-emitting elements.

6. The display device according to claim 1, further comprising an adhesive layer, wherein the adhesive layer is positioned between the one of the plurality of the light-emitting elements and the second substrate, and wherein the one of the plurality of the light-emitting elements is configured to emit visible light to the second substrate side through the adhesive layer.

7. The display device according to claim 1, wherein a first image on the first display portion is displayed at a lower frame frequency than a second image on the second display portion.

8. A display module comprising the display device according to claim 1, wherein the display device is configured to be attachable to a dashboard of a car, wherein a first image displayed on the first display portion comprises an image comprising information on at least one of a speed and a rotation speed, and wherein a second image displayed on the second display portion comprises an image comprising information on at least one of a remaining amount of fuel, a temperature of cooling water, a mileage, and a transmission state.

9. The display module according to claim 8, wherein the first image is displayed at a lower frame frequency than the second image.

10. An electronic device comprising the display device according to claim 1, wherein a first image displayed on the first display portion comprises a moving image comprising information on at least one of a product or a usage of the product, and wherein a second image displayed on the second display portion comprises a still image comprising information on at least one of a name, a price, a production area, an ingredient, and contents of the product.

11. The electronic device according to claim 10, wherein the first image is displayed at a lower frame frequency than the second image.

* * * * *